(12) United States Patent
Ito et al.

(10) Patent No.: US 11,753,260 B2
(45) Date of Patent: Sep. 12, 2023

(54) UNLOADING APPARATUS

(71) Applicant: Daifuku Co., Ltd., Osaka (JP)

(72) Inventors: Kazutoshi Ito, Tokyo (JP); Satoshi Yoda, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 17/939,068

(22) Filed: Sep. 7, 2022

(65) Prior Publication Data
US 2023/0073191 A1 Mar. 9, 2023

(30) Foreign Application Priority Data

Sep. 8, 2021 (JP) ................................. 2021-146095

(51) Int. Cl.
*B65G 59/04* (2006.01)
*B65G 47/90* (2006.01)
*B65G 47/91* (2006.01)

(52) U.S. Cl.
CPC .......... *B65G 59/04* (2013.01); *B65G 47/905* (2013.01); *B65G 47/918* (2013.01); *B65G 2201/02* (2013.01)

(58) Field of Classification Search
CPC .... B65G 59/04; B65G 47/905; B65G 47/918; B65G 2201/02
USPC ............ 414/796.8, 799, 796.5, 796.6, 796.7, 414/796.9, 797, 797.2
See application file for complete search history.

(56) References Cited

U.S. PATENT DOCUMENTS

| | | | | |
|---|---|---|---|---|
| 3,780,884 A | * | 12/1973 | Jones ..................... | B65G 57/04 414/793 |
| 4,441,844 A | * | 4/1984 | Miller .................... | B65G 59/02 271/42 |
| 4,753,564 A | * | 6/1988 | Pearce ................... | B65G 59/04 414/789.5 |
| 5,882,174 A | * | 3/1999 | Woerner ................ | B65G 65/00 414/795.8 |
| 7,988,406 B2 | * | 8/2011 | Schafer ................ | B65G 1/1378 414/796.5 |
| 9,481,530 B2 | * | 11/2016 | Brandmüller .......... | B65G 61/00 |
| 10,583,560 B1 | * | 3/2020 | Rodrigues ............. | B65G 1/137 |

(Continued)

FOREIGN PATENT DOCUMENTS

JP 318033 U 2/1991

*Primary Examiner* — Lynn E Schwenning
(74) *Attorney, Agent, or Firm* — THE WEBB LAW FIRM

(57) ABSTRACT

An unloading apparatus includes a holding apparatus configured to hold side a holding target article group in such a manner as to hold the holding target article group and an article subgroup above the holding target article group; a suction apparatus including a plurality of suction parts that are configured to hold a plurality of articles constituting a suction target article group, and are configured to operate independently from each other, the suction target article is an article subgroup in an uppermost level; a first lifting apparatus configured to lift and lower a placement part and the holding apparatus relative to each other; a second lifting apparatus configured to lift and lower the suction apparatus and the holding apparatus relative to each other; and a first transport apparatus configured to receive at least one article subgroup held by the holding apparatus, and transport the at least one received article subgroup.

9 Claims, 13 Drawing Sheets

(56) References Cited

U.S. PATENT DOCUMENTS

2013/0015675 A1\* 1/2013 Pickard ................ B65G 61/00
212/327

\* cited by examiner

Fig. 13

UNLOADING APPARATUS

CROSS-REFERENCE TO RELATED APPLICATION

This application claims priority to Japanese Patent Application No. 2021-146095 filed Sep. 8, 2021, the disclosure of which is hereby incorporated by reference in its entirety.

BACKGROUND OF THE INVENTION

1. Field of the Invention

The present invention relates to an unloading apparatus that separates, from a stacked article group composed of a plurality of articles stacked on a placement part, an article subgroup composed of articles belonging to at least one level.

2. Description of the Related Art

An example of such an unloading apparatus is disclosed in Japanese Utility Model Application Publication No. H03-18033 (Patent Document 1). Hereinafter, the reference signs in parentheses and names used in "Description of the Related Art" correspond to those used in Patent Document 1.

The unloading apparatus of Patent Document 1 includes a rectangular frame-shaped hand (32), a plurality of suction pads (36) provided in a central portion of the hand (32), and two pairs of pushers (48a, 48b). A stacked article group, which is composed of a plurality of stacked articles, is placed on a pallet P, and is arranged directly below the hand (32).

In this unloading apparatus, for articles having a low strength or the like, the plurality of suction pads (36) suck the upper surfaces of an article subgroup in the uppermost level. Also, for articles that are difficult to be sucked, the two pairs of pushers (48a, 48b) push and hold side surfaces of the article subgroup in the uppermost level. Then, the hand (32) is raised together with the suction pads (36) and the pushers (48a, 48b), so that the article subgroup in the uppermost level is separated from an article subgroup in the second and lower levels from the top.

SUMMARY OF THE INVENTION

In such an unloading apparatus, unloading operations are performed from a stacked article group per level. Accordingly, articles the number of which is other than an integral multiple of the number of articles constituting an article subgroup in one level cannot be unloaded. However, there may be cases where, instead of unloading operations per level, articles the number of which is other than an integral multiple of the number of articles constituting an article subgroup in one level need to be unloaded, depending on the configuration of apparatuses located downstream of the unloading apparatus, or operation content.

Therefore, there is a demand for realizing an unloading apparatus that enables unloading of articles the number of which is other than an integral multiple of the number of articles constituting an article subgroup in one level, from a stacked article group.

A characteristic configuration of the unloading apparatus according to the present disclosure relates to an unloading apparatus configured to separate, from a stacked article group composed of a plurality of articles stacked on a placement part, at least one article subgroup composed of a plurality of articles belonging to at least one level, the unloading apparatus including: a holding apparatus configured to hold side peripheral surfaces of a holding target article group, which is an article subgroup in one level among a plurality of article subgroups in a plurality of levels which article subgroups are included in the stacked article group, in such a manner as to hold the holding target article group and an article subgroup above the holding target article group; a suction apparatus including a plurality of suction parts that are configured to hold a plurality of articles constituting a suction target article group by sucking upper surfaces of the plurality of articles, and are configured to operate independently from each other, the suction target article group being an article subgroup in an uppermost level among the plurality of article subgroups in the plurality of levels which article subgroups are included in the stacked article group; a first lifting apparatus configured to lift and lower the placement part and the holding apparatus relative to each other; a second lifting apparatus configured to lift and lower the suction apparatus and the holding apparatus relative to each other; and a first transport apparatus configured to receive at least one article subgroup held by the holding apparatus from the holding apparatus, and transport the at least one received article subgroup.

According to this configuration, the holding apparatus can be used to separate, from the stacked article group, an article subgroup per layer.

Also, the suction apparatus can be used to separate, from the stacked article group, one or more articles of the article subgroup in the uppermost level. Accordingly, for example, by using the holding apparatus to hold the side peripheral surfaces of an article subgroup in a level below the uppermost level in the stacked article group, and using the first lifting apparatus to lift and lower the placement part and the holding apparatus relative to each other, it is possible to separate at least one article subgroup from the stacked article group. Furthermore, by using the suction apparatus to hold one or more articles from the article subgroup in the uppermost level, and using the second lifting apparatus to lift and lower the suction apparatus and the holding apparatus relative to each other, it is possible to leave a required number of articles on the holding apparatus side. Also, by using the first transport apparatus to receive the article subgroup held by the holding apparatus, it is possible to separate and transport the required number of articles from the stacked article group. With this, according to this configuration, it is possible to unload, from the stacked article group, articles the number of which is other than an integral multiple of the number of articles constituting an article subgroup in one level.

Further features and advantages of the unloading apparatus will become apparent from the following description of exemplary and non-limiting embodiments given with reference to the drawings.

BRIEF DESCRIPTION OF THE DRAWINGS

FIG. 13 is a plan view schematically illustrating a route in which the stacked article group and the article subgroup are moved.

DESCRIPTION OF THE INVENTION

1. Overview

Figure 1:
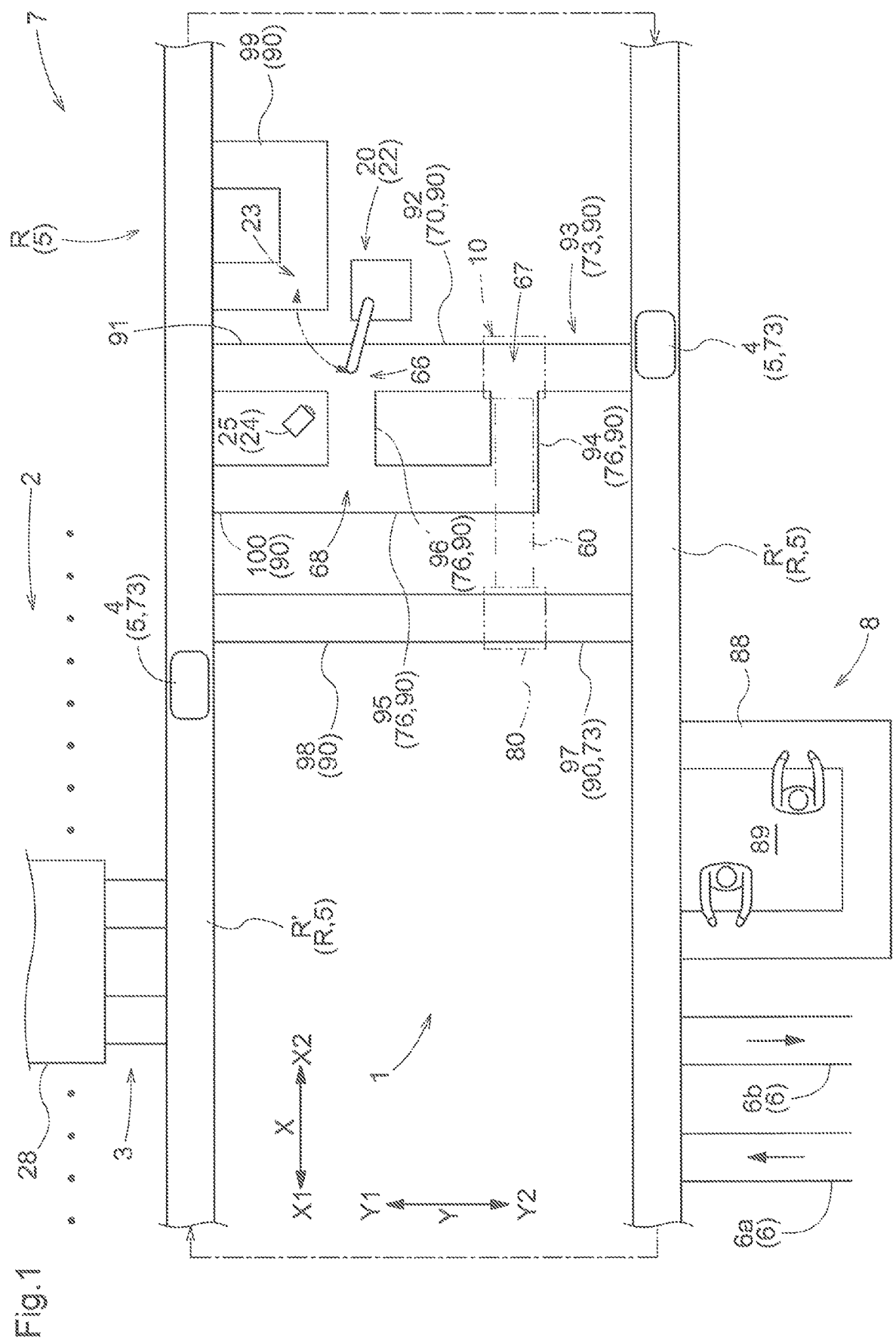
FIG. 1 is a plan view illustrating an article transport facility.

The following will describe an example in which an unloading apparatus 1 is applied to an article transport facility 7 with reference to the drawings. As shown in FIG. 1, the article transport facility 7 includes an automated warehouse 2 in which articles W are housed, an article transport apparatus 5 that transports articles W, an unloading apparatus 1 that unloads articles W, and a delivery/collection conveyor 6 that delivers articles W between the article transport facility 7 and the outside. In the present embodiment, the automated warehouse 2, the unloading apparatus 1, and the delivery/collection conveyor 6 are connected to each other via the article transport apparatus 5. Also, the article transport facility 7 includes, between a floor F and a ceiling, a second floor G.

The second floor G is installed at a position distanced upward from the floor F. Furthermore, a frame support D is installed between the second floor G and the ceiling. The frame support D is installed at a position distanced upward from the second floor G.

In the following, a direction in which a later-described holding apparatus 10 and a receiving apparatus 80 are lined up is defined as a first direction X, and a direction orthogonal to the first direction X is defined as a second direction Y. Also, a side (left side in FIG. 1) in the first direction X is defined as a first direction-first side X1, and another side (right side in FIG. 1) is defined as a first direction-second side X2. Similarly, a side (upper side in FIG. 1) in the second direction Y is defined as a second direction-first side Y1, and another side (lower side in FIG. 1) is defined as a second direction-second side Y2.

In the present embodiment, articles W are housed in the automated warehouse 2 while being placed on pallets. Specifically, a plurality of articles W are housed in the automated warehouse 2 while being stacked on pallets. In this example, a plurality of articles W placed on one pallet are cuboid, and have the same shape and size. Also, a predetermined number of articles W per level are stacked in a plurality of levels on one pallet. In the shown example, eight cardboard boxes per level are stacked in a plurality of levels, namely, four levels in FIGS. 2 and 5. Note that articles W are, for example, cardboard boxes in which drink water, food, clothes, or the like are housed.

2. Automated Warehouse

As shown in FIG. 1, the automated warehouse 2 includes a storage rack 28 that stores articles W, an entry/withdrawal conveyor 3 that delivers articles W into and from the automated warehouse 2, and a not-shown in-warehouse transport apparatus that transports articles W between the storage rack 28 and the entry/withdrawal conveyor 3. In the present embodiment, the automated warehouse 2 is installed on the floor F. In the present embodiment, the automated warehouse 2 is arranged on a side (second direction-first side Y1 in the shown example) opposite to a side (second direction-second side Y2 in the shown example) on which the unloading apparatus 1 is arranged with an article transport route R of the article transport apparatus 5 interposed therebetween. Also, in the automated warehouse 2, a plurality of storage rack 28 are lined up in a direction in which the article transport route R extends (first direction X in the shown example). The storage rack 28 includes a plurality of storage parts (not shown). In the storage parts, articles W are stored while being placed on pallets. The in-warehouse transport apparatus transports articles W placed on pallets between the plurality of storage parts and the entry/withdrawal conveyor 3. For example, a stacker crane or the like can be used as the in-warehouse transport apparatus. The entry/withdrawal conveyor 3 is connected to the article transport apparatus 5, and delivers articles W to and from the article transport apparatus 5. In this example, a plurality of entry/withdrawal conveyors 3 are lined up in the extending direction of the article transport route R (first direction X in the shown example). For example, any of various types of well-known conveyors such as a roller conveyor, a belt conveyor, and a chain conveyor can be used as the entry/withdrawal conveyor 3.

3. Delivery/collection Conveyor

The delivery/collection conveyor 6 is an apparatus that delivers articles W into the article transport facility 7 from the outside, and delivers articles W out of the article transport facility 7 to the outside. In the present embodiment, the delivery/collection conveyor 6 is connected to the article transport route R. Also, the delivery/collection conveyor 6 is adjacent to a later-described addition work area 8. In the shown example, the delivery/collection conveyor 6 is adjacent to the addition work area 8, on the first direction-first side X1. Note that in this example, the delivery/collection conveyor 6 includes a collection conveyor 6a that collects articles W from the outside of the article transport facility 7 to the inside thereof, and a delivery conveyor 6b that delivers articles W from the inside of the article transport facility 7 to the outside thereof. For example, any of various types of well-known conveyors such as a roller conveyor, a belt conveyor, and a chain conveyor can be used as the collection conveyor 6a and the delivery conveyor 6b.

4. Article Transport Apparatus

The article transport apparatus 5 is an apparatus that transports articles W between the automated warehouse 2 and the unloading apparatus 1.

Also, the article transport apparatus 5 transports articles W between the unloading apparatus 1 and the delivery/collection conveyor 6, and transports articles W between the automated warehouse 2 and the delivery/collection conveyor 6. In the present embodiment, a transport route on which articles W are transported by the article transport apparatus 5 is referred to as an "article transport route R". In this example, the article transport apparatus 5 includes an article transport vehicle 4 that travels along the article transport route R, and transports articles W. Here, the article transport route R is a route (rail) that guides the article transport vehicle 4 in a travel direction, and is installed on the floor F. In the present embodiment, the article transport route R is an endless circular route on which the article transport vehicle 4 can travel in a loop. Also, as shown in FIG. 1, the article transport route R is adjacent to the unloading apparatus 1 and the automated warehouse 2. Furthermore, the article transport route R is arranged in such a manner as to surround the unloading apparatus 1.

In the present embodiment, as shown in FIG. 1, the article transport route R includes a plurality of straight portions R'. In this example, the article transport route R includes two straight portions R' arranged in parallel to each other. The two straight portions R' extend in the first direction X, and are separated from each other in the second direction Y. In the shown example, the article transport route R' is connected to the entry/withdrawal conveyor 3, the delivery/collection conveyor 6, and a later-described work conveyor 88. Also, the unloading apparatus 1 including a later-described transport conveyor 90 is provided between the two straight portions R'. The straight portions R' are also connected to the transport conveyor 90. In this example, the article transport route R further includes connections (not shown). End portions of the two straight portions R' on the first direction-first side X1 are coupled to each other at the connection. Also, end portions of the two straight portions R' on the first direction-second side X2 are coupled to each other at the connection. With this, the article transport vehicle 4 travels on the article transport route R in one direction, and travels in a loop on the article transport route R.

The article transport vehicle 4 travels on the article transport route R in a predetermined direction. In FIG. 1, the travel direction of the article transport vehicle 4 is indicated by an arrow. In the present embodiment, the article transport vehicle 4 transports articles W placed on a pallet. The article transport vehicle 4 includes a well-known transfer apparatus including a conveyor, a forklift that moves forward and rearward, or the like. With this, the article transport vehicle 4 delivers articles W together with a pallet to and from the conveyors connected to the article transport route R.

5. Unloading Apparatus

Figure 2:
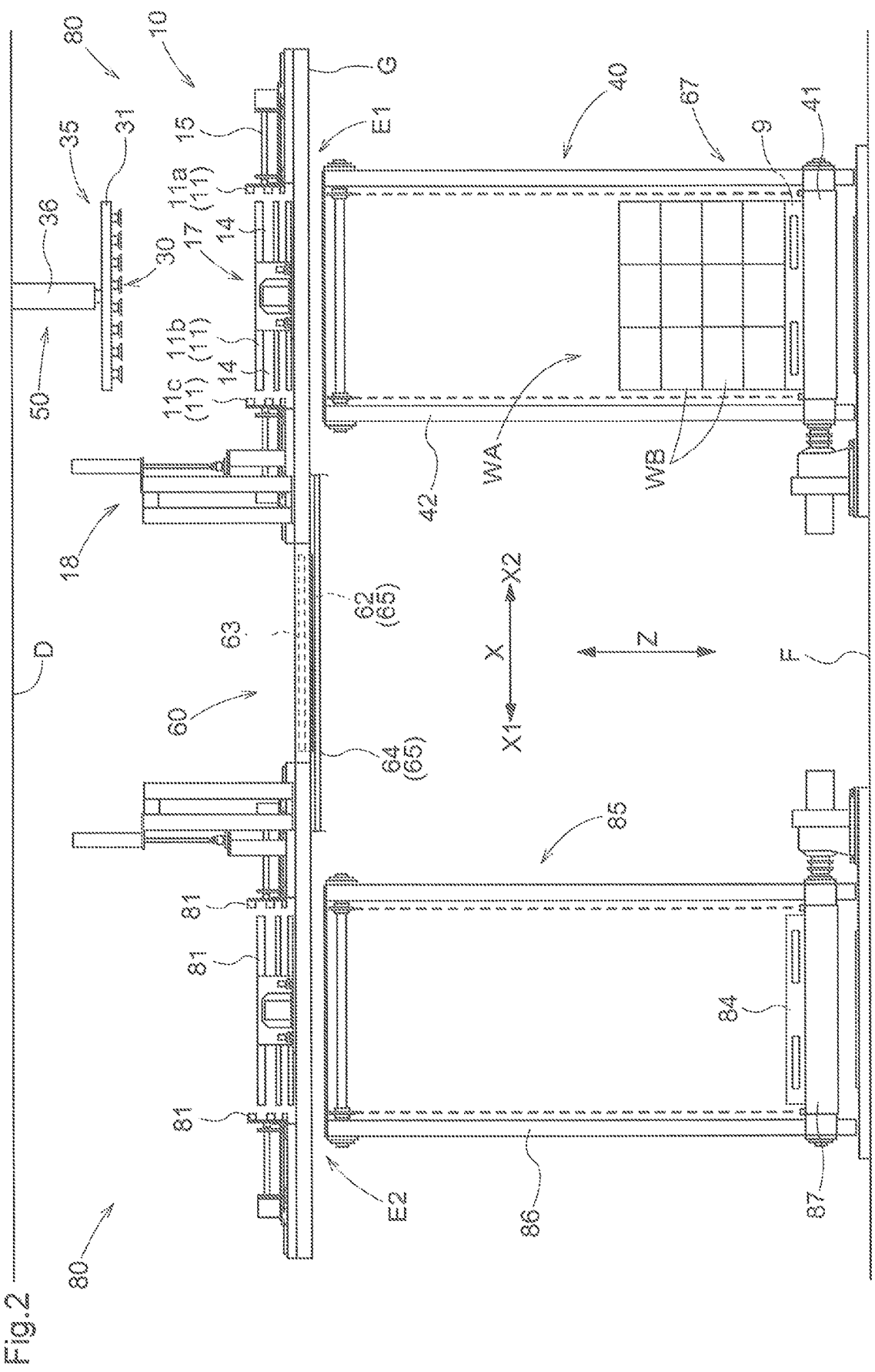
FIG. 2 is a side view illustrating an unloading apparatus, a first lifting apparatus, a first transport apparatus, a receiving apparatus, and a feeding apparatus.

As shown in FIG. 2, the unloading apparatus 1 is an apparatus that separates, from a stacked article group WA composed of a plurality of articles W stacked on a placement part 9, an article subgroup WB composed of a plurality of articles W belonging to at least one level, and unloads the separated article subgroup WB. In the present embodiment, the unloading apparatus 1 separates, from the stacked article group WA stacked in a cuboid shape as a whole on the placement part 9, an article subgroup WB in the uppermost level or the level immediately below the uppermost level (second level from the top), and moves it. Also, in the present embodiment, the stacked article group WA withdrawn from the automated warehouse 2 is fed to the unloading apparatus 1. Then, the article subgroup WB separated by the unloading apparatus 1 is transported to the delivery/collection conveyor 6. The unloading apparatus 1 is provided at an internal position surrounded by the article transport route R. In the shown example, the unloading apparatus 1 is provided between the two straight portions R' located parallel to each other. The unloading apparatus 1 is connected to the automated warehouse 2 and the delivery/collection conveyor 6 via this article transport route R. Note that, in this example, the placement part 9 is a pallet. In the shown example, a plurality of articles W per level are stacked in a plurality of levels, which constitute the stacked article group WA. More specifically, eight articles W per level are stacked in four levels, which constitute the stacked article group WA. Therefore, the stacked article group WA as a whole has a rectangular shape.

The unloading apparatus 1 includes, as main constituent components, a holding apparatus 10, a retrieval apparatus 20, a suction apparatus 35, a first lifting apparatus 40, a second lifting apparatus 50, a first transport apparatus 60, a second transport apparatus 70, a third transport apparatus 73, a fourth transport apparatus 76, a receiving apparatus 80, a feeding apparatus 85, an addition work area 8, and a control device H. Also, the unloading apparatus 1 further includes first to tenth conveyors 91 to 100, as the transport conveyor 90 for constituting a transport apparatus including the second transport apparatus 70, the third transport apparatus 73, and the fourth transport apparatus 76. Note that, unless otherwise specifically noted, the transport conveyor 90 is provided with, at their junctions and branch parts, direction changing apparatuses (so-called transers) for changing the transport direction for the stacked article group WA.

5-1. Transport Conveyor

The following will describe the transport conveyor 90 with reference to FIG. 1. Of the plurality of conveyors constituting the transport conveyor 90, the first conveyor 91 receives a stacked article group WA housed in the automated warehouse 2 from the article transport vehicle 4 that travels on the article transport route R, and passes it to the second conveyor 92. The second conveyor 92 receives the stacked article group WA from the first conveyor 91 or a stacked article group WA from the sixth conveyor 96, and passes it to the third conveyor 93 or the fourth conveyor 94. The third conveyor 93 receives the stacked article group WA from the second conveyor 92, and passes it to the article transport vehicle 4 that travels on the article transport route R. In the shown example, the first conveyor 91, the second conveyor 92, and the third conveyor 93 are linearly arranged in the second direction Y. The connection between the first conveyor 91 and the second conveyor 92 serves as a junction 66 between the first conveyor 91 and the sixth conveyor 96. Also, the connection between the second conveyor 92 and the third conveyor 93 serves as a first branch part 67 at which the second conveyor 92 is branched into the third conveyor 93 and the fourth conveyor 94. The first branch part 67 is provided with a first lift 41 of a later-described first lifting apparatus 40. In this example, the first lift 41 has the placement part 9 placed thereon, and has a direction change function of changing the transport direction of the stacked article group WA.

Also, of the plurality of conveyors constituting the transport conveyor 90, the fourth conveyor 94, which is branched from the second conveyor 92, receives the stacked article group WA from the first lifting apparatus 40 and passes it to the fifth conveyor 95. The fifth conveyor 95 receives the stacked article group WA from the fourth conveyor 94, and passes it to the sixth conveyor 96 or the tenth conveyor 100. The sixth conveyor 96 receives the stacked article group WA from the fifth conveyor 95, and passes it to the second conveyor 92. The tenth conveyor 100 receives the stacked article group WA from the fifth conveyor 95, and passes it to the article transport vehicle 4 that travels on the article transport route R. In the shown example, the fifth conveyor 95 and the tenth conveyor 100 are linearly arranged in the second direction Y. The fourth conveyor 94 and the sixth conveyor 96 are arranged extending in the first direction X in parallel to each other. The connection between the fifth conveyor 95 and the tenth conveyor 100 serves as a second branch 68 at which the fifth conveyor 95 is branched into the tenth conveyor 100 and the sixth conveyor 96.

Also, of the plurality of conveyors constituting the transport conveyor 90, the seventh conveyor 97 receives an article subgroup WB placed on a later-described support body 84 from the feeding apparatus 85, and passes it to the article transport vehicle 4 that travels on the article transport route R. The eighth conveyor 98 receives an empty support body 84 from the article transport vehicle 4, and passes it to the feeding apparatus 85. In the shown example, the seventh conveyor 97 and the eighth conveyor 98 are linearly arranged in the second direction Y. A second lift 87 of the feeding apparatus 85 is provided between the seventh conveyor 97 and the eighth conveyor 98. In this example, the second lift 87 is provided with the support body 84 placed thereon, and functions as a conveyor that transports the support body 84 in the second direction Y.

Also, of the plurality of conveyors constituting the transport conveyor 90, the ninth conveyor 99 receives an empty support body 84 from the article transport vehicle 4 that travels on the article transport route R, and transports the empty support body 84 to a placement position 23. One or more articles W are placed on the empty support body 84 by the retrieval apparatus 20 at the placement position 23. Furthermore, the ninth conveyor 99 passes the support body 84 on which the articles W have been placed from the placement position 23 to the article transport vehicle 4 on the article transport route R. In this example, the support body 84 is a pallet. Also, in the shown example, the ninth conveyor 99 is laid in a U-shape.

Note that, for example, any of various types of well-known conveyors such as a roller conveyor, a belt conveyor, and a chain conveyor can be used as the plurality of conveyors constituting the transport conveyor 90.

5-2. Second Transport Apparatus

As shown in FIG. 1, the second transport apparatus 70 is an apparatus that transports a stacked article group WA from the retrieval apparatus 20 to the holding apparatus 10 and the suction apparatus 35. By transporting the stacked article group WA to the first lifting apparatus 40, the second transport apparatus 70 transports the stacked article group WA to the holding apparatus 10 and the suction apparatus 35 via the first lifting apparatus 40. In the present embodiment, the second transport apparatus 70 transports a stacked article group WA from the retrieval apparatus 20 to the second direction-second side Y2. In this example, the second conveyor 92 corresponds to the second transport apparatus 70.

5-3. Fourth Transport Apparatus

As shown in FIG. 1, the fourth transport apparatus 76 is an apparatus that transports a stacked article group WA from the holding apparatus 10 to the retrieval apparatus 20. In the present embodiment, the fourth transport apparatus 76 transports the remaining stacked article group WA separated from the article subgroup WB by the holding apparatus 10 to the retrieval apparatus 20. Here, the retrieval apparatus 20 is adopted to retrieve articles W from a stacked article group WA placed at the junction 66. Accordingly, the fourth transport apparatus 76 transports the remaining stacked article group WA to the junction 66. In this example, the fourth conveyor 94, the fifth conveyor 95, and the sixth conveyor 96 correspond to the fourth transport apparatus 76.

5-4. Third Transport Apparatus

As shown in FIG. 1, the third transport apparatus 73 is an apparatus that transports a support body 84 on which an article subgroup WB has been placed by the receiving apparatus 80 to the addition work area 8. In the present embodiment, by receiving the support body 84 on which the article subgroup WB has been placed from the second lifting apparatus 50, the third transport apparatus 73 receives the support body 84 from the receiving apparatus 80 via the second lifting apparatus 50. Then, the third transport apparatus 73 transports the received support body 84 to the later-described work conveyor 88 in the addition work area 8. In this example, the support body 84 on which the article subgroup WB has been placed is transported by the seventh conveyor 97 to the article transport route R, then is transferred to the article transport vehicle 4 on the article transport route R, and is transported to the work conveyor 88 by the article transport vehicle 4 (see FIG. 13). Therefore, in this example, the seventh conveyor 97 and the article transport vehicle 4 correspond to the third transport apparatus 73.

5-5. Addition Work Area

As shown in FIG. 1, the addition work area 8 is an area in which work for adding one or more articles W to the article subgroup WB placed on the support body 84 is performed. In the present embodiment, the addition work area 8 is arranged adjacent to the article transport route R. Also, the addition work area 8 is adjacent to the delivery/collection conveyor 6, on the first direction-second side X2. In the addition work area 8, for example, work is performed for adding, to the support body 84 on which an article subgroup WB has been placed and that has been transported to the addition work area 8, one or more articles W whose destination is the same as that of the article subgroup WB, the work being so-called assortment work. In this example, the addition work area 8 includes a work region 89 and the work conveyor 88. The work region 89 is a region in which at least one of an operator and a work robot performs assortment work or the like. The work conveyor 88 is connected to the article transport route R, and is configured to receive a support body 84 on which an article subgroup WB has been placed from the article transport vehicle 4, and transports it to the work region 89. Also, the work conveyor 88 transports the support body 84 on which the article subgroup WB has been placed from the work region 89 to the article transport route R, and passes it to the article transport vehicle 4. The article transport vehicle 4 receives the article subgroup WB and transports it to the delivery conveyor 6b.

5-6. Retrieval Apparatus

Figure 4:
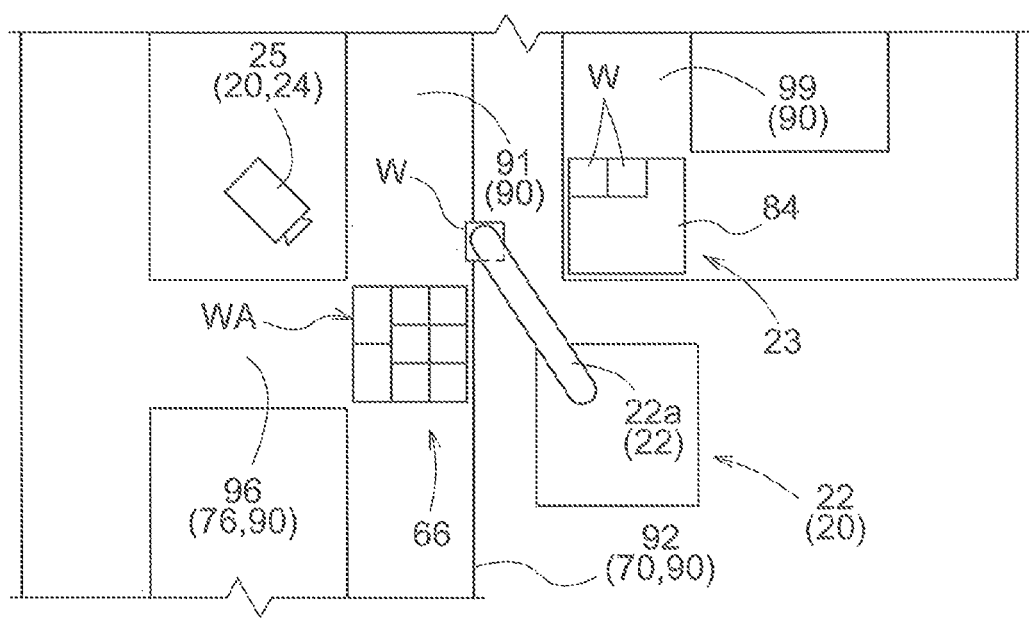
FIG. 4 is a plan view schematically illustrating a retrieval apparatus and transport conveyors.

As shown in FIGS. 1 and 4, the retrieval apparatus 20 is an apparatus that retrieves one or more articles W from the article subgroup WB in the uppermost level in the stacked article group WA. In the present embodiment, before the stacked article group WA is transported to the holding apparatus 10, the retrieval apparatus 20 retrieves one or more articles W from the article subgroup WB in the uppermost level. In this example, the retrieval apparatus 20 is installed on the floor F. Also, the retrieval apparatus 20 is provided on a route for transporting the stacked article group WA between the holding apparatus 10 and the article transport route R. In the shown example, the retrieval apparatus 20 is arranged at a position that corresponds to the junction 66. Specifically, at the junction 66 serving as a retrieval position, the retrieval apparatus 20 retrieves articles W from the stacked article group WA placed at the retrieval position. In the present embodiment, as shown in FIG. 4, the retrieval apparatus 20 includes a transfer apparatus 22 and an image recognition system 24.

The image recognition system 24 performs image recognition on one or more articles W belonging to the article subgroup WB in the uppermost level in the stacked article group WA. In the present embodiment, the image recognition system 24 includes an imaging device 25. The imaging device 25 images, from above, the article subgroup WB in the uppermost level in the stacked article group WA at the retrieval position. Then, the image recognition system 24 determines, based on the imaging information obtained by the imaging device 25, the number of articles W constituting the article subgroup WB in the uppermost level. The image recognition system 24 transmits information indicating the determined number of articles W constituting the article subgroup WB in the uppermost level, to the control device H. In the present embodiment, as shown in FIGS. 1 and 4, the transfer apparatus 22, and the imaging device 25 of the image recognition system 24 are arranged at separate positions. Note that, preferably, the imaging device 25 is suspended downwardly from the second floor G, for example.

The transfer apparatus 22 retrieves, based on a result of image recognition performed by the image recognition system 24, one or more articles W from the article subgroup WB in the uppermost level in the stacked article group WA, and places the retrieved articles W on the support body 84. In the present embodiment, in accordance with an instruction of the control device H based on the number of articles W in the uppermost level that has been determined by the image recognition system 24, the transfer apparatus 22 retrieves the articles W from the article subgroup WB in the uppermost level and places them on the support body 84. Here, the transfer apparatus 22 transfers the articles W, by holding and retrieving one or more articles W from the uppermost level in the stacked article group WA located at the retrieval position (junction 66), and placing the one or more articles W on an empty support body 84 placed at the loading position 23 (see FIG. 4). At this time, if a required number of articles W cannot be transferred by one transfer, the transfer apparatus 22 repeats the transfer operation multiple times. In this example, the transfer apparatus 22 is a picking robot. In this case, as shown in FIG. 4, the transfer apparatus 22 includes a drive part 22*a* configured as a robot arm such as, e.g., a multi-joint arm, and a suction pad (not shown) supported at a leading end of the drive part 22*a*. In the shown example, the drive part 22*a* sucks and holds the articles W from the uppermost level in the stacked article group WA located at the retrieval position (junction 66), moves them to the empty support body 84 located at the placement position 23, and places them on this support body 84 (see FIG. 4). The support body 84 on which the articles W are placed is transported to the article transport route R by the ninth conveyor 99, and then is transferred to the article transport vehicle 4 on the article transport route R. Then, the support body 84 is transported to the automated warehouse 2 by the article transport vehicle 4, and is housed in the automated warehouse 2.

5-7. First Lifting Apparatus

The first lifting apparatus 40 is an apparatus that lifts and lowers the placement part 9 and the holding apparatus 10 relative to each other. This first lifting apparatus 40 arranges an article subgroup WB (holding target article group WC) placed on a target level for holding of the holding apparatus 10 at a position appropriate for holding of the holding apparatus 10. Also, the first lifting apparatus 40 separates the article subgroup WB held by the holding apparatus 10 and an article subgroup WB in the levels below the target level from each other in the up-down direction. In the present embodiment, the first lifting apparatus 40 lifts and lowers the placement part 9 with respect to the holding apparatus 10. As shown in FIG. 2, the first lifting apparatus 40 is installed on the floor F. Also, the first lifting apparatus 40 is arranged directly below the holding apparatus 10. In other words, the first lifting apparatus 40 is provided below the holding apparatus 10 at a position at which the first lifting apparatus 40 overlaps with the holding apparatus 10 when viewed in the up-down direction Z. In this example, the first lifting apparatus 40 is arranged at the first branch part 67. In the present embodiment, the first lifting apparatus 40 includes columns 42 standing upright in the up-down direction Z, and the first lift 41 that rises and lowers along the columns 42. The first lift 41 supports the placement part 9 on which the stacked article group WA has been placed from below.

Between the upper ends of the columns 42 and the lower ends of the holding apparatus 10, a first space E1 is formed that a later-described support part 63 of the first transport apparatus 60 can enter. As a result of the first lift 41 rising and lowering, the placement part 9 and the stacked article group WA placed on the placement part 9 are lifted and lowered. Then, the first lifting apparatus 40 lifts the first lift 41 to position the article subgroup WB belonging to the target level for holding of the holding apparatus 10, at a height that corresponds to the height at which the holding apparatus 10 is installed. Also, in this example, the first lift 41 further has a direction changing function of changing the transport direction of the stacked article group WA. With this, the first lift 41 passes the stacked article group WA received from the second conveyor 92 to a conveyor selected from the third conveyor 93 and the fourth conveyor 94. That is to say, the first lift 41 functions as the first branch part 67 at a position that corresponds to the transport surface of the second conveyor 92, the third conveyor 93, or the fourth conveyor 94.

5-8. Holding Apparatus

Figure 3:
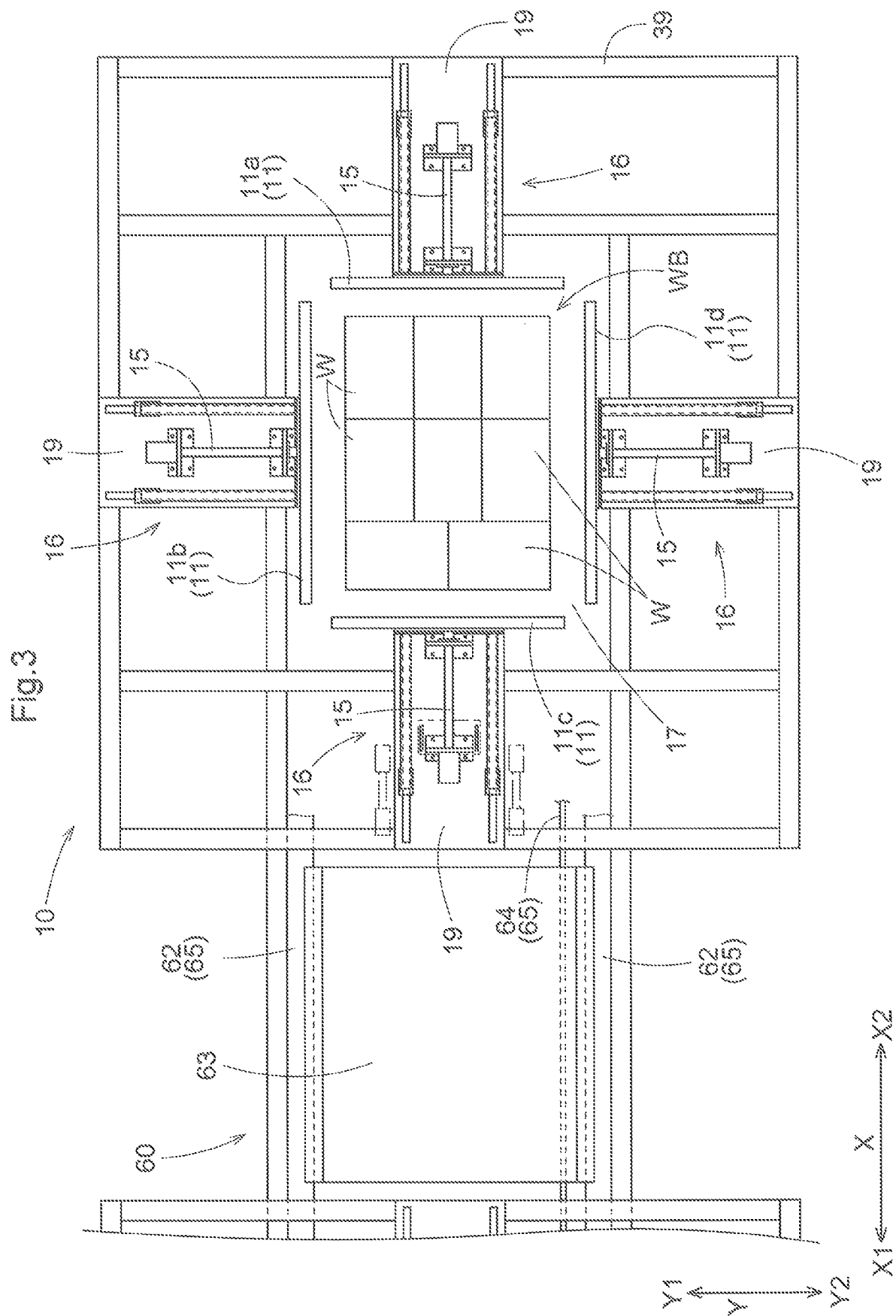
FIG. 3 is a plan view illustrating the unloading apparatus and the first transport apparatus.

As shown in FIGS. 2 and 3, the holding apparatus 10 is an apparatus that holds the side peripheral surfaces of a holding target article group WC, which is an article subgroup WB in one level among a plurality of article subgroups WB in a plurality of levels which article subgroups are included in the stacked article group WA, in such a manner as to hold the holding target article group WC and an article subgroup WB above the holding target article group WC. In the present embodiment, by holding the side peripheral surface of the article subgroup WB in the uppermost level, or the article subgroup WB in the level immediately below the uppermost level (second level from the top), the holding apparatus 10 holds the holding target article group WC and the article subgroup WB above the holding target article group WC. That is to say, in the present embodiment, the article subgroup WB in the uppermost level or the level immediately below the uppermost level serves as the holding target article group WC. In this example, when the number of articles W to be separated from the stacked article group WA is equal to the number of articles W constituting the article subgroup WB in one level, the holding apparatus 10 regards the article subgroup WB in the uppermost level as the holding target article group WC. Also, when the number of articles W to be separated from the stacked article group WA is greater than the number of articles W constituting the article subgroup WB in the uppermost level, and is smaller than the number of articles W constituting an article subgroup WB in the uppermost level and the second level from the top, the holding apparatus 10 regards the article subgroup WB in the level located immediately below the uppermost level as the holding target article group WC. Then, a plurality of articles W held by the holding apparatus 10 serve as the article subgroup WB to be separated (unloaded) from the stacked article group WA. The article subgroup WB held by the holding apparatus 10 is then separated from the article subgroup WB located below the holding target article group WC, and is passed to the receiving apparatus 80 via the first transport apparatus 60. Note that when the number of articles W to be separated from the stacked article group WA is greater than the number of articles W constituting an article subgroup WB of two levels, the operation for holding and separating the article subgroup WB is performed multiple times.

In the present embodiment, as shown in FIG. 2, the holding apparatus 10 is installed on the second floor G.

Also, the holding apparatus 10 is arranged above the first lifting apparatus 40 in such a manner as to overlap with the first lifting apparatus 40 when viewed in the up-down direction Z. Also, the holding apparatus 10 is arranged adjacent to the first transport apparatus 60. Specifically, the holding apparatus 10 is adjacent to the first transport apparatus 60, on the first direction-second side X2. Also, the holding apparatus 10 is arranged above the support part 63 included in the first transport apparatus 60. In the shown example, the holding apparatus 10 is arranged in such a manner as to overlap with the first branch part 67 when viewed in the up-down direction Z.

In the present embodiment, as shown in FIG. 3, the holding apparatus 10 includes a plurality of holding members 11 that press and hold the holding target article group WC. Specifically, the holding apparatus 10 includes a first holding member 11a and a third holding member 11c that face each other in the first direction X with the holding target article group WC interposed therebetween, and a second holding member lib and a fourth holding member 11d that face each other in the second direction Y with the holding target article group WC interposed therebetween. The holding apparatus 10 holds the holding target article group WC using the first holding member 11a and the third holding member 11c with the holding target article group WC interposed therebetween in the first direction X. Also, the holding apparatus 10 holds the holding target article group WC using the second holding member lib and the fourth holding member 11d with the holding target article group WC interposed therebetween in the second direction Y. In this example, the third holding member 11c is arranged on a side of the first transport apparatus 60.

In the present embodiment, the first holding member 11a and the third holding member 11c are configured to be movable in the first direction X. Similarly, the second holding member lib and the fourth holding member 11d are configured to be movable in the second direction Y. As a result of the first holding member 11a and the third holding member 11c coming close to each other in the first direction X, the holding target article group WC is pushed and held in the first direction X. As a result of the second holding member lib and the fourth holding member 11d coming close to each other in the second direction Y, the holding target article group WC is pushed and held in the second direction Y.

In the present embodiment, as shown in FIGS. 2 and 3, the holding apparatus 10 includes drive mechanisms 15 and linear motion guide mechanisms 16. The drive mechanisms 15 are mechanisms for reciprocating the holding members 11 in the first direction X or the second direction Y. The drive mechanisms 15 are provided to correspond to the respective holding members 11. In this example, four drive mechanisms 15 are provided to correspond to four holding members 11. Each of the four drive mechanisms 15 is coupled to the corresponding holding member 11. With this, the first holding member 11a and the third holding member 11c can come close to and separate from each other. Similarly, the second holding member lib and the fourth holding member 11d can come close to and separate from each other. In this example, the drive mechanisms 15 are configured by a servo-motor and a ball screw. For example, a configuration is possible in which the nut portions of the ball screws are coupled to the holding members 11, and the screw portions of the ball screws are driven to rotate.

The linear motion guide mechanisms 16 are provided to correspond to the respective holding members 11. In this example, four sets of linear motion guide mechanisms 16 are provided to correspond to four holding members 11. Specifically, one set of linear motion guide mechanisms 16 is provided for one holding member 11. With this, the holding members 11 (the first holding member 11a, the second holding member lib, the third holding member 11c, and the fourth holding member 11d) are guided by the corresponding set of linear motion guide mechanism 16, and are reciprocated in the first direction X or the second direction Y.

In the present embodiment, the holding apparatus 10 further includes support members 19, a frame body 39, and a lifting unit 18. The frame body 39 supports four support members 19. With this, the frame body 39 supports the holding members 11, the linear motion guide mechanisms 16 that guide the holding members 11, and the drive mechanisms 15. Also, in the present embodiment, since the first lifting apparatus 40 is arranged below the holding apparatus 10, the frame body 39 also functions to support the holding apparatus 10 in a manner such that the holding apparatus 10 is arranged at an appropriate height for the first lifting apparatus 40. The support members 19 are provided on the frame body 39. Four support members 19 are provided to correspond to four holding members 11. The linear motion guide mechanisms 16 and the drive mechanisms 15 are supported on the support members 19. The holding members 11 are supported by the linear motion guide mechanisms 16, and are coupled to the drive mechanisms 15. The lifting unit 18 is configured to be able to lift and lower the support member 19 that supports the third holding member 11c. With this, when a separated article subgroup WB is moved in the first direction X by the support part 63, the lifting unit 18 retracts the third holding member 11c and the drive mechanism 15 of the third holding member 11c upward so that the article subgroup WB does not interfere with them.

In the present embodiment, the holding target article group WC is arranged in a holding region 17, which is a region surrounded by the plurality of holding members 11 (here, the first holding member 11a, the second holding member 11b, the third holding member 11c, and the fourth holding member 11d). The holding region 17 is a region in which an unloading operation for separating the article subgroup WB including the holding target article group WC from the stacked article group WA is performed. In this example, the holding region 17 is a rectangular region when viewed in the up-down direction Z, and has dimensions such that the stacked article group WA can pass therethrough in the up-down direction Z. The dimension of the holding region 17 in the up-down direction Z corresponds to a region in which four holding members 11 are arranged in the up-down direction Z.

When the first lift 41 rises, and the holding target article group WC of the stacked article group WA placed on the first lift 41 is arranged at a position that corresponds to the holding region 17, the holding members 11 are moved toward the holding target article group WC, and push and hold the side peripheral surfaces of the holding target article group WC. In this example, as a result of the first holding member 11a and the third holding member 11c coming close to each other, the holding target article group WC is pushed and held in the first direction X. Similarly, as a result of the second holding member 11b and the fourth holding member 11d coming close to each other, the holding target article group WC is pushed and held in the second direction Y. Also, as a result of the holding members 11 moving to sides opposite to the holding target article group WC, the state of pushing and holding the side peripheral surfaces of the holding target article group WC is released. In this example, as a result of the first holding member 11a and the third holding member 11c separating from each other in the first direction X, and the second holding member 11b and the fourth holding member 11d separating from each other in the second direction Y, the state of pushing and holding the holding target article group WC is released.

Note that, in this example, the holding members 11 each include interference avoiding parts 14. In the shown example, the recess and protrusion-shaped interference avoiding parts 14 are formed at both end portions of the second holding member 11b in the first direction X (see FIG. 2). The first holding member 11a, the third holding member 11c, and the fourth holding member 11d also include interference avoiding parts 14 having the same configuration. The interference avoiding parts 14 are formed in a manner such that the interference avoiding parts 14 of adjacent holding members 11 are alternatively arranged in the up-down direction.

With this, even if the four holding members 11 come close to a side of the holding target article group WC, the holding members 11 can push and hold the holding target article group WC without interfering with each other.

5-9. Second Lifting Apparatus

The second lifting apparatus 50 is an apparatus that lifts and lowers the suction apparatus 35 and the holding apparatus 10 relative to each other. With this second lifting apparatus 50, articles W belonging to the uppermost level in the stacked article group WA come close to the suction apparatus 35. Also, with the second lifting apparatus 50, the articles W that belong to the uppermost level and are sucked by the suction apparatus 35 are separated from the stacked article group WA in the up-down direction. In this example, as shown in FIG. 2, the second lifting apparatus 50 is provided above the suction apparatus 35 at a position at which the second lifting apparatus 50 overlaps with the suction apparatus 35 when viewed in the up-down direction Z. Also, the second lifting apparatus 50 is supported while being suspended by the frame support D from above. Also, the suction apparatus 35 is coupled to the lower end of the second lifting apparatus 50.

In the present embodiment, the position of the holding apparatus 10 in the up-down direction is fixed, and the second lifting apparatus 50 lifts and lowers the suction apparatus 35 relative to the holding apparatus 10. That is to say, by moving the suction apparatus 35 in the up-down direction Z, the second lifting apparatus 50 lifts and lowers the suction apparatus 35 and the holding apparatus 10 relative to each other. As shown in FIG. 2, the second lifting apparatus 50 includes a lifting mechanism 36. The lifting mechanism 36 is suspended from the frame support D, and supports the suction apparatus 35 from above. In this example, a cylinder that uses atmosphere pressure or liquid pressure to operate a rod in the up-down direction Z is employed as the lifting mechanism 36. Here, a leading end of the cylinder is coupled to the suction apparatus 35. With this lifting mechanism 36, the suction apparatus 35 is reciprocated in the up-down direction Z.

5-10. Suction Apparatus

The suction apparatus 35 is an apparatus that sucks and holds some or all of the articles W constituting the article subgroup WB in the uppermost level in the stacked article group WA. By controlling the number of articles W to be sucked and held by this suction apparatus 35, it is possible to adjust the number of articles W to be separated from the stacked article group WA by the holding apparatus 10. In the present embodiment, the suction apparatus 35 is supported and suspended by the lifting mechanism 36. Also, the suction apparatus 35 is provided immediately above the holding region 17.

In other words, the suction apparatus 35 is arranged above the holding apparatus 10 at a position at which the suction apparatus 35 overlaps with the holding apparatus 17 when viewed in the up-down direction Z. In the shown example, the suction apparatus 35 is arranged at a position at which the suction apparatus 35 overlaps with the first branch part 67, the first lifting apparatus 40, and the second lifting apparatus 50, when viewed in the up-down direction Z.

The suction apparatus 35 includes a plurality of suction parts 30 that suck the upper surfaces of a plurality of articles W constituting a suction target article group WD and hold the articles W, and are configured to operate independently from each other, the suction target article group WD being an article subgroup WB in the uppermost level among the plurality of article subgroups WB in the plurality of levels which article subgroups WB are included in the stacked article group WA. That is to say, the suction apparatus 35 is configured to come close to the suction target article group WD from above, and can suck the upper surfaces of the plurality of articles W constituting the suction target article group WD. Also, the plurality of suction parts 30 of the suction apparatus 35 operate independently from each other, and are switched between a suction state of sucking articles W, and a non-suction state of not sucking articles W. With this, the suction parts 30 can suck and hold one or more articles W from the suction target article group WD. In the present embodiment, some or all of the plurality of suction parts 30 suck the articles W of the suction target article group WD in a state in which the holding target article group WC is arranged in the holding region 17. Specifically, the suction apparatus 35 lowers the plurality of suction parts 30 to a position at which they abut against the upper surfaces of the articles W of the suction target article group WD, and causes, in this state, some or all of the plurality of suction parts 30 to suck the articles W. In this example, when the number of articles W to be separated from the stacked article group WA is greater than the number of articles W constituting the article subgroup WB in the uppermost level, and is smaller than the number of articles W constituting the article subgroup WB in the uppermost level and the second level from the top, the suction apparatus 35 sucks and holds one or more articles from the article subgroup WB in the uppermost level to perform adjustment in a manner such that the number of articles W of the article subgroup WB held by the holding apparatus 10 is equal to the number of articles W to be separated.

In the present embodiment, the suction apparatus 35 includes a suction support part 31 that supports a plurality of suction parts 30 as one piece. In this example, the plurality of suction parts 30 are lined up in both the first direction X and the second direction Y. The suction support part 31 supports the plurality of suction parts 30 so that they can be lifted and lowered as one piece by the second lifting apparatus 50 while maintaining the arrangement of the plurality of suction parts 30. Also, this suction support part 31 is coupled to the lifting mechanism 36 of the second lifting apparatus 50. In the shown example, the plurality of suction parts 30 are fixed to the surface of the suction support part 31 that faces downward. In this example, the plurality of suction parts 30 are each a suction pad. The suction pads are connected to sucking equipment via not-shown piping and valves. Also, by opening and closing the valves provided in midway positions of the piping, the suction parts 30 are configured to be switchable between the suction state and non-suction state.

5-11. Feeding Apparatus

As shown in FIG. 2, the feeding apparatus 85 is an apparatus that feeds an empty support body 84 to the receiving apparatus 80. In the present embodiment, the feeding apparatus 85 also functions to pass the article subgroup WB received by the receiving apparatus 80 to the third transport apparatus 73 (see FIG. 1). As shown in FIG. 2, the feeding apparatus 85 is installed on the floor F. Also, the feeding apparatus 85 is arranged directly below the receiving apparatus 80. In other words, the feeding apparatus 85 is installed below the receiving apparatus 80 at a position at which the feeding apparatus 85 overlaps with the receiving apparatus 80 in the up-down direction Z. In this example, the feeding apparatus 85 is arranged between the seventh conveyor 97 and the eighth conveyor 98 when viewed in a plan view.

The basic configuration of the feeding apparatus 85 of this example is the same as that of the first lifting apparatus 40. Therefore, descriptions of the configurations common to those of the first lifting apparatus 40 are simplified. Similar to the first lifting apparatus 40, the feeding apparatus 85 includes second columns 86 and a second lift 87. Between the upper ends of the second columns 86 and the lower ends of the receiving apparatus 80, a second space E2 is formed that the later-described support part 63 of the first transport apparatus 60 can enter. The second lift 87 supports an empty support body 84 or a support body 84 on which an article subgroup WB is placed, from below. By lifting and lowering the second lift 87, the feeding apparatus 85 brings the empty support body 84 to a height that corresponds to a height at which the receiving apparatus 80 is set. Specifically, the second lift 87 receives the empty support body 84 from the eighth conveyor 98 and moves upward. Then, the second lift 87 brings the placement surface of the empty support body 84 to a height at which it is adjacent to the lower side of the second space E2. As will be described later, the receiving apparatus 80 subsequently places, on the empty support body 84, the article subgroup WB separated from the stacked article group WA. Then, the second lift 87 is lowered and passes the article subgroup WB placed on the support body 84 to the seventh conveyor 97 (third transport apparatus 73).

5-12. Receiving Apparatus

The receiving apparatus 80 is an apparatus that receives an article subgroup WB from the first transport apparatus 60, and places it on the support body 84. In the present embodiment, the receiving apparatus 80 is provided on the first direction-first side X1 with respect to the holding apparatus 10. In this example, the receiving apparatus 80 is installed on the second floor G. Also, the receiving apparatus 80 is arranged above the feeding apparatus 85 at a position at which the receiving apparatus 80 overlaps with the feeding apparatus 85 when viewed in the up-down direction Z.

In the present embodiment, the basic configuration of the receiving apparatus 80 is the same as that of the holding apparatus 10, and will be described in a simplified manner. In the present embodiment, the receiving apparatus 80 receives the article subgroup WB separated by the holding apparatus 10 from the first transport apparatus 60. In the present embodiment, the receiving apparatus 80 includes a plurality of reception holding members 81 that hold an article subgroup WB. In this example, the reception holding members 81 has the same configuration as that of the holding members 11. That is to say, the receiving apparatus 80 of this example includes four reception holding members 81. By pushing and holding the holding target article group WC of the article subgroup WB using the reception holding members 81, the receiving apparatus 80 receives the article subgroup WB from the first transport apparatus 60. Then, the feeding apparatus 85 passes the article subgroup WB to the support body 84 arranged at a height that corresponds to the height at which the receiving apparatus 80 is provided. Note that, in this example, of the four reception holding members 81, the reception holding member 81 located on the first transport apparatus 60 side is configured to be movable in the up-down direction Z in a manner similar to the third holding member 11c of the holding apparatus 10. With this, when the article subgroup WB is transported to the receiving apparatus 80 by the first transport apparatus 60, interference between the article subgroup WB and the reception holding members 81 is avoided.

5-13. First Transport Apparatus

As shown in FIG. 1, the first transport apparatus 60 is an apparatus that receives and transports an article subgroup WB held by the holding apparatus 10 from the holding apparatus 10. In the present embodiment, the first transport apparatus 60 transports the article subgroup WB received from the holding apparatus 10 toward the receiving apparatus 80.

Then, the first transport apparatus 60 passes the article subgroup WB to the receiving apparatus 80. Thus, the first transport apparatus 60 is a transport apparatus that connects the holding apparatus 10 and the receiving apparatus 80.

In the present embodiment, the first transport apparatus 60 is installed on the second floor G. Also, the first transport apparatus 60 is arranged extending from a region in which it overlaps with the holding apparatus 10 to a region in which it overlaps with the receiving apparatus 80, when viewed in the up-down direction Z.

In the present embodiment, as shown in FIGS. 2 and 3, the first transport apparatus 60 includes a support part 63 that supports an article subgroup WB received from the holding apparatus 10, and a moving mechanism 65 that moves the support part 63. Also, the moving mechanism 65 moves the support part 63, below the holding apparatus 10, between a receiving position that is overlapped with the holding apparatus 10 when viewed in the up-down direction Z, and a delivery position that is not overlapped with the holding apparatus 10 when viewed in the up-down direction Z. At the receiving position, the support part 63 is arranged in the first space E1 (see FIG. 2) formed below the holding apparatus 10. In the present embodiment, at the receiving position, the support part 63 receives an article subgroup WB from the holding apparatus 10. Then, by moving to the first direction-first side X1, the support part 63 transports the article subgroup WB toward the first direction-first side X1. Then, at the delivery position, the support part 63 passes the article subgroup WB to the receiving apparatus 80. Specifically, at the delivery position, the support part 63 on which the article subgroup WB has been placed is arranged in the above-described second space E2 (see FIG. 2). Then, at the delivery position, the article subgroup WB placed on the support part 63 is passed to the receiving apparatus 80. Then, the support part 63 moves from the delivery position toward the receiving position. Thus, the article subgroup WB is passed from the receiving apparatus 80 to the support body 84 fed by the feeding apparatus 85. Note that, in the shown example, the support part 63 is a slide table.

In this example, the moving mechanism 65 includes a guide 62 that guides the support part 63 in the first direction X, a transport belt 64 for moving the support part 63 between the receiving position and the delivery position, a drive source (not shown), and the like. In the shown example, the transport belt 64 is arranged extending in the first direction X, and is wound around a plurality of drive pullies (not shown). When the transport belt 64 is rotated by the drive source and the drive pullies, the support part 63 is reciprocated in the first direction X.

5-14. Control Device

The control device H controls, during an unloading operation, the holding apparatus 10, the suction apparatus 35, the first lifting apparatus 40, the second lifting apparatus 50, the first transport apparatus 60, and the retrieval apparatus 20.

In the present embodiment, the control device H controls the holding apparatus 10, the suction apparatus 35, the first lifting apparatus 40, the second lifting apparatus 50, and the first transport apparatus 60 to perform a required number of articles-separating operation of separating a required number of articles W from a stacked article group WA. The following will describe the required number of articles-separating operation in order. Here, a required number means the number of articles W required to be separated (unloaded) from a stacked article group WA, the number being determined based on instruction information such as a shipping instruction or a shipping order.

Figure 5:
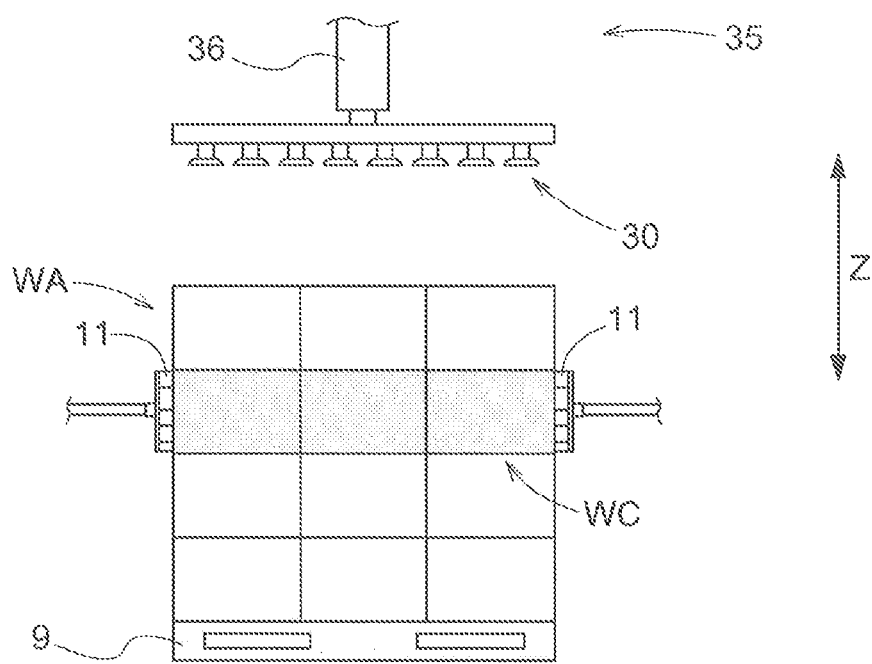
FIG. 5 is a side view schematically illustrating a process in which a holding target article group is held by a holding apparatus.
Figure 6:
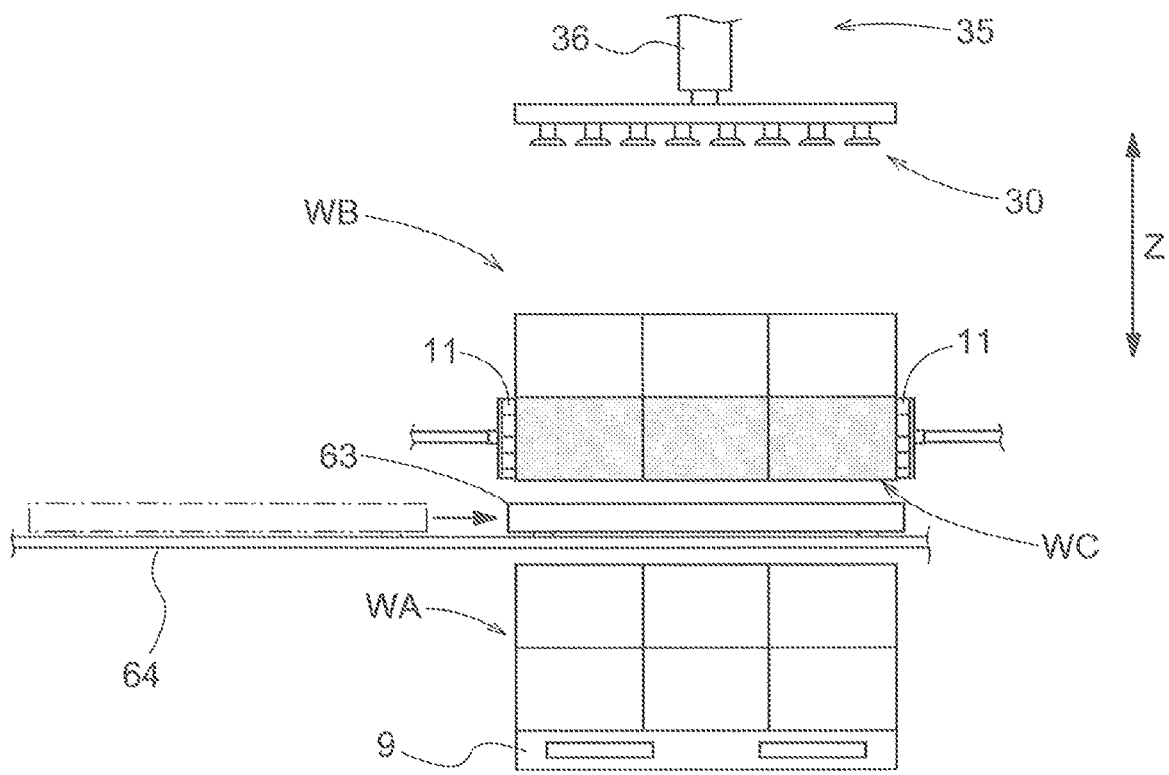
FIG. 6 is a side view schematically illustrating a process in which an article subgroup is separated from a stacked article group.

As shown in FIGS. 5 and 6, the control device H controls the holding apparatus 10 to hold the side peripheral surfaces of the holding target article group WC set in a level below the uppermost level in the stacked article group WA, and controls the first lifting apparatus 40 to separate the article subgroup WB in the plurality of levels from the stacked article group WA. In this example, the control device H controls the first lifting apparatus 40 to lift or lower the stacked article group WA, so that the holding target article group WC, which is an article subgroup WB belonging to a target level to be held by the holding apparatus 10, is arranged at a position appropriate for the holding of the holding apparatus 10. Then, the control device H controls the holding apparatus 10 to hold the holding target article group WC. In the shown example, the control device H controls the holding apparatus 10 to hold the side peripheral surfaces of the holding target article group WC that is the article subgroup WB in the level immediately below the uppermost level (the second level from the top). Then, the control device H controls the first lifting apparatus 40 to lower the first lift 41 while the holding target article group WC is being held by the holding apparatus 10. With this, the holding target article group WC held by the holding apparatus 10, and the article subgroup WB (in this example, the article subgroup WB in the uppermost level) above the holding target article group WC are separated from the article subgroup WB located below the holding target article group WC (in this example, the article subgroup WB in the third and lower layers from the top). Then, the control device H controls the first transport apparatus 60 to move the support member 63 from the delivery position to the receiving position.

Figure 7:
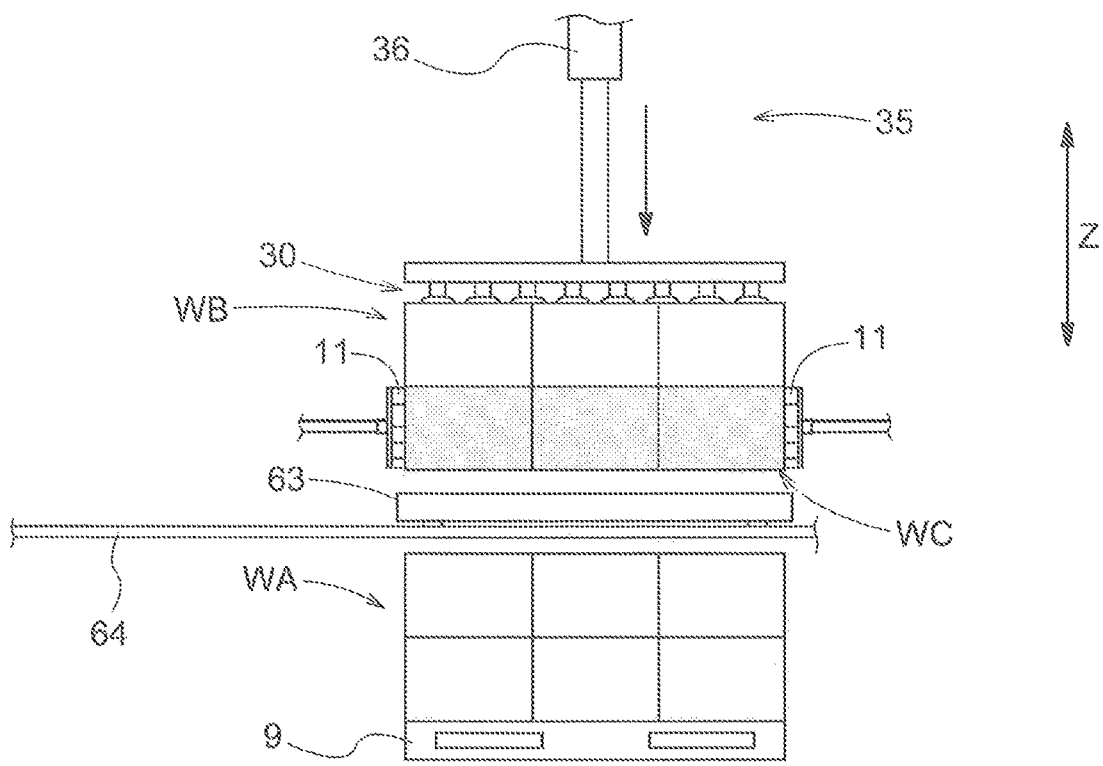
FIG. 7 is a side view schematically illustrating a process in which a suction apparatus is lowered relative to the holding apparatus.
Figure 8:
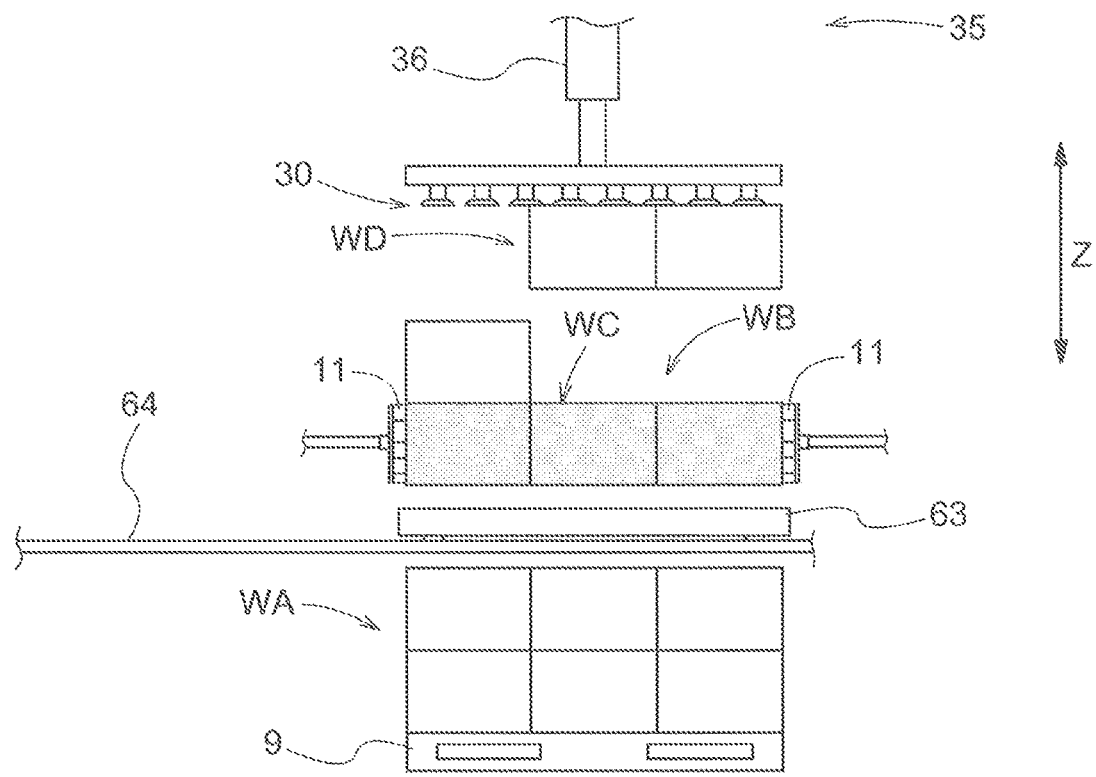
FIG. 8 is a side view schematically illustrating a process in which the suction apparatus sucks a suction target article group.

As shown in FIGS. 7 and 8, the control device H controls the suction apparatus 35 to suck and hold some or all of the articles W of a suction target article group WD that is the article subgroup WB in the uppermost level in the separated article subgroup WB in the plurality of levels, and controls the second lifting apparatus 50 to lift the articles W held by the suction apparatus 35 relative to the holding apparatus 10. In this example, the control device H controls the second lifting apparatus 50 to lower the suction apparatus 35 while the holding target article group WC is being held by the holding apparatus 10. More specifically, the control device H lowers the suction apparatus 35 so that the plurality of suction parts 30 are located at positions at which they abut against the upper surfaces of the articles W constituting the suction target article group WD. Then, the control device H controls the suction apparatus 35 so that the suction parts 30 suck some or all of the articles W of the suction target article group WD. At this time, the control device H switches some or all of the plurality of suction parts 30 from the non-suction state to the suction state, so that the suction parts 30 suction articles W required to be sucked. That is to say, the control device H determines the number of articles W required to be sucked so that the sum of the number of articles W of the holding target article group WC that are held by the holding apparatus 10 and the number of articles W that are above the holding target article group WC (in the shown example, the number of articles W in the uppermost level) and are not sucked by the suction apparatus 35 is equal to the required number. In other words, in this example, the number of articles W required to be sucked is obtained by subtracting the required number from the sum of the number of articles W of the holding target article group WC and the number of articles W of the article subgroup WB above the holding target article group WC. Also, the control device H controls the suction apparatus 35 to suck the determined number of articles W. Accordingly, the control device H controls the suction apparatus 35 to suck some or all of the articles W of the suction target article group WD. Then, the control device H controls the suction apparatus 35 and the second lifting apparatus 50 to lift the suction apparatus 35 while maintaining the suction state. With this, at least one of the articles W held by the suction apparatus 35 are separated from the holding apparatus 10 and the holding target article group WC.

Figure 9:
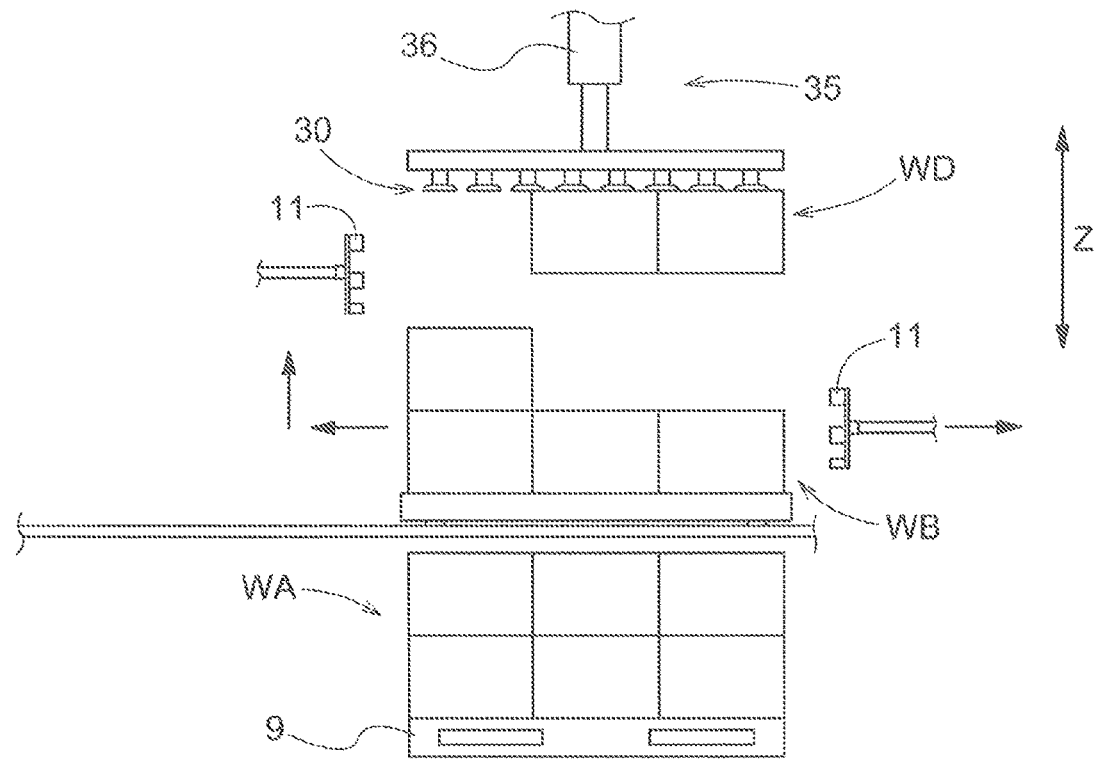
FIG. 9 is a side view schematically illustrating a process in which an article subgroup is transported by the first transport apparatus.
Figure 10:
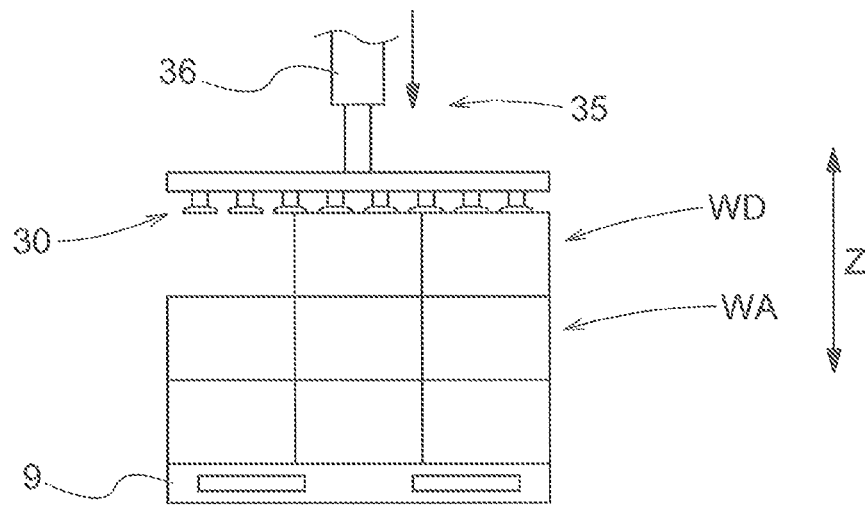
FIG. 10 is a side view schematically illustrating a process in which articles held by the suction apparatus are returned to the stacked article group.
Figure 11:
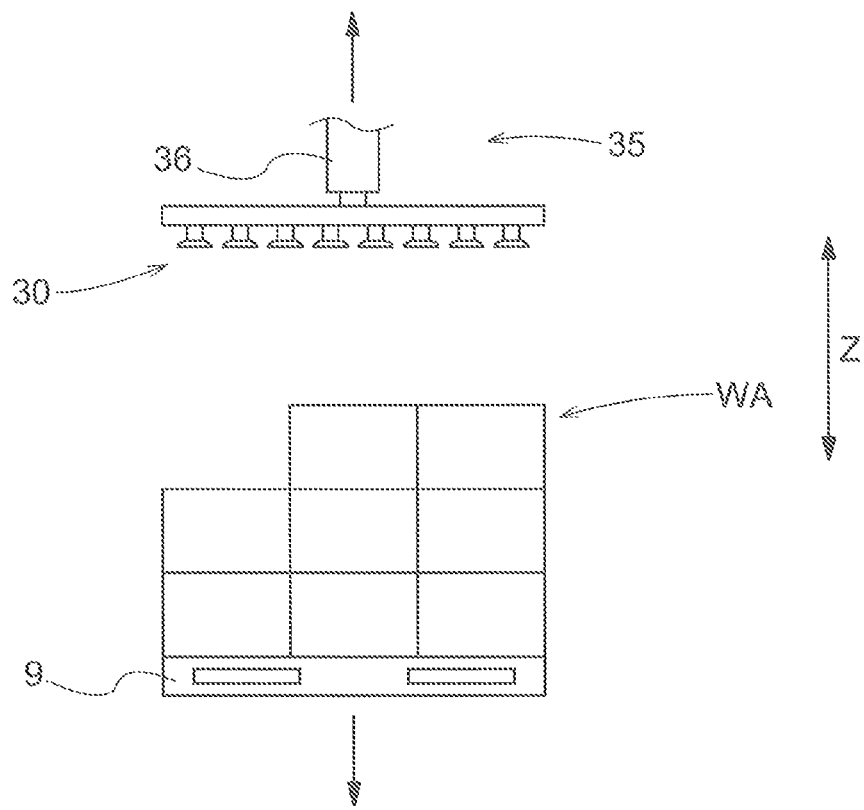
FIG. 11 is a side view schematically illustrating the remaining articles of the stacked article group placed on a placement part, and the suction apparatus.

Also, as shown in FIGS. 9, 10, and 11, the control device H performs control in a manner such that the article subgroup WB held by the holding apparatus 10 is received and transported by the first transport apparatus 60, and the articles W held by the suction apparatus 35 are returned onto the stacked article group WA remaining on the placement part 9 or onto the placement part 9. In this example, the control device H controls the holding apparatus 10 to release the holding of the holding target article group WC by the holding members 11. With this, the article subgroup WB held by the holding apparatus 10 is placed onto the transport surface of the support part 63 of the first transport apparatus 60. Then, the control device H controls the first transport apparatus 60 to move the support part 63 from the receiving position to the delivery position. With this, the article subgroup WB constituted by the required number of articles W separated from the stacked article group WA is transported toward the receiving apparatus 80. At this time, when the lifting unit 18 lifts the third holding member 11c, interference between the article subgroup WB placed on the support part 63 and the third holding member 11c is avoided. Then, the control device H controls the first lifting apparatus 40 to lift the stacked article group WA remaining on the placement part 9. Specifically, the first lift 41 rises so that the article subgroup WB in the uppermost level of the remaining stacked article group WA is arranged at a height that corresponds to the holding region 17. Up to here, the suction apparatus 35 maintains the sucking and holding of the one or more articles W. Then, the control device H controls the second lifting apparatus 50 to lower the suction apparatus 35 while the suction apparatus 35 maintains the suction state. Specifically, the control device H lowers the suction apparatus 35 so that the lower surfaces of the articles W sucked by the suction apparatus 35 are located at positions at which they abut against the upper surfaces of the article subgroup WB in the uppermost level in the stacked article group WA remaining on the placement part 9. Then, the control device H switches the state of the suction apparatus 35 from the suction state of sucking the articles W to the non-suction state. Accordingly, the articles W held by the suction apparatus 35 are returned onto the stacked article group WA remaining on the placement part 9. Note that if the holding apparatus 10 holds the article subgroup WB in the lowermost level as the holding target article group WC, and passes the holding target article group WC to the support part 63 of the first transport apparatus 60, there is no stacked article group WA remaining on the placement part 9, and thus the articles W held by the suction apparatus 35 are returned onto the placement part 9.

Note that the control device H can also control the suction apparatus 35 and the second lifting apparatus 50 to return the articles W sucked and held by the suction apparatus 35 onto the article subgroup WB held by the holding apparatus 10. Specifically, the control device H controls the second lifting apparatus 50 to lower the suction apparatus 35 that is holding some or all of the articles W of the suction target article group WD, while the holding apparatus 10 is holding the holding target article group WC. Also, the control device H can control the suction apparatus 35 to place an appropriate number of articles W onto the article subgroup WB held by the holding apparatus 10. At this time, the control device H switches the suction parts 30 that are sucking the articles W to be placed onto the article subgroup WB held by the holding apparatus 10, from the suction state to the non-suction state.

In the present embodiment, in a case where the suction apparatus 35 sucks and hold some or all of the articles W of the suction target article group WD, and then returns the articles W onto the stacked article group WA remaining on the placement part 9 or onto the placement part 9, the control device H controls the suction apparatus 35 to preferentially return, out of the articles W held by the suction apparatus 35, the articles W to be located on a side closer to the side peripheral surfaces of the stacked article group WA. In this example, the control device H performs a required number of articles-separating operation, and then transports again the stacked article group WA remaining on the placement part 9 toward the holding apparatus 10 using the fourth transport apparatus 76 (the fourth conveyor 94, the fifth conveyor 95, and the sixth conveyor 96) (the dashed-two dotted line in FIG. 13). Then, the control device H performs a new required number of articles-separating operation on this stacked article group WA. Here, if the articles W held by the suction apparatus 35 are located on the central side in the uppermost level that is far from the side peripheral surfaces of the stacked article group WA, when the holding apparatus 10 holds the articles W in the level immediately below the uppermost level (the second level from the top) serving as the holding target article group WC, a situation may occur in which the holding target article group WC falls apart due to a load of the articles W located on the central side. The reason for such a situation is that the pressing force transmitted from the holding apparatus 10 to the articles W constituting the holding target article group WC is reduced toward the central side far from the side peripheral surfaces of the stacked article group WA. By preferentially returning the articles W held by the suction apparatus 35 to a position near a side peripheral surfaces of the stacked article group WA, it is possible to reduce the risk that the holding target article group WC held by the holding apparatus 10 falls apart. When the number of articles W constituting the stacked article group WA remaining on the placement part 9 is smaller than the required number of articles W to be separated from the stacked article group WA based on the following instruction information, the remaining stacked article group WA is returned to the automated warehouse 2. In this example, the stacked article group WA is transferred to the article transport vehicle 4 via the fourth conveyor 94, the fifth conveyor 95, and the tenth conveyor 100 (the dashed-one dotted line in FIG. 13). Then, the stacked article group WA is transported to the automated warehouse 2 by the article transport vehicle 4, and enters the automated warehouse 2.

The following will describe control of the retrieval apparatus 20 according to the present embodiment.

When the required number is greater than the number of articles W of the article subgroup WB in the uppermost level, the control device H can control the retrieval apparatus 20 to retrieve a number of articles W from the article subgroup WB in the uppermost level according to which the sum of the number of articles W of the article subgroup WB in the uppermost level in the stacked article group WA and the number of articles W of the article subgroup WB in at least one level below the uppermost level is equal to the required number. By the retrieval apparatus 20 retrieving articles W in this manner, it is possible to eliminate the need of the suction apparatus 35 sucking and holding the articles W. In this case, in the holding apparatus 10, the control device H controls the holding apparatus 10 and the first lifting apparatus 40 to separate the article subgroup WB in the level immediately below the uppermost level in the stacked article group WA, serving as the holding target article group WC, from the article subgroup WB below this level. Accordingly, it is possible to separate the required number of articles W from the stacked article group WA. Then, the control device H controls the first transport apparatus 60 to transport the separated article subgroup WB to the receiving apparatus 80.

Alternatively, the control device H may also control the retrieval apparatus 20 to retrieve a number of articles W according to which the sum of the articles W constituting the stacked article group WA on the placement part 9 is equal to the required number. In this case, the control device H can eliminate the needs of holding the article subgroup WB using the holding apparatus 10 and of sucking and holding the articles W using the suction apparatus 35. If, for example, the number of articles W constituting the stacked article group WA on the placement part 9 is small, it is possible to efficiently obtain a required number of articles W with this control.

In the present embodiment, the control device H includes a storage unit 47 and a determination unit 48. The storage unit 47 stores types and numbers of articles W of stacked article groups WA housed in the automated warehouse 2. Also, the storage unit 47 stores instruction information that were externally input. The instruction information includes the number (required number) of articles W required to be separated from a stacked article group WA by the unloading apparatus 1 and to be shipped. The storage unit 47 further stores imaging information obtained by the imaging device 25, and information such as the number of articles W in the uppermost level obtained based on the imaging information. The determination unit 48 determines whether or not the retrieval apparatus 20 can retrieve articles W, and if it is determined that the retrieval apparatus 20 retrieves articles W, the determination unit 48 determines the number of articles to be retrieved. Also, the determination unit 48 determines whether or not the suction apparatus 35 can suck and hold articles W, and if it is determined that the suction apparatus 35 sucks and holds articles W, the determination unit 48 determines the number of articles to be sucked and held.

Figure 12:
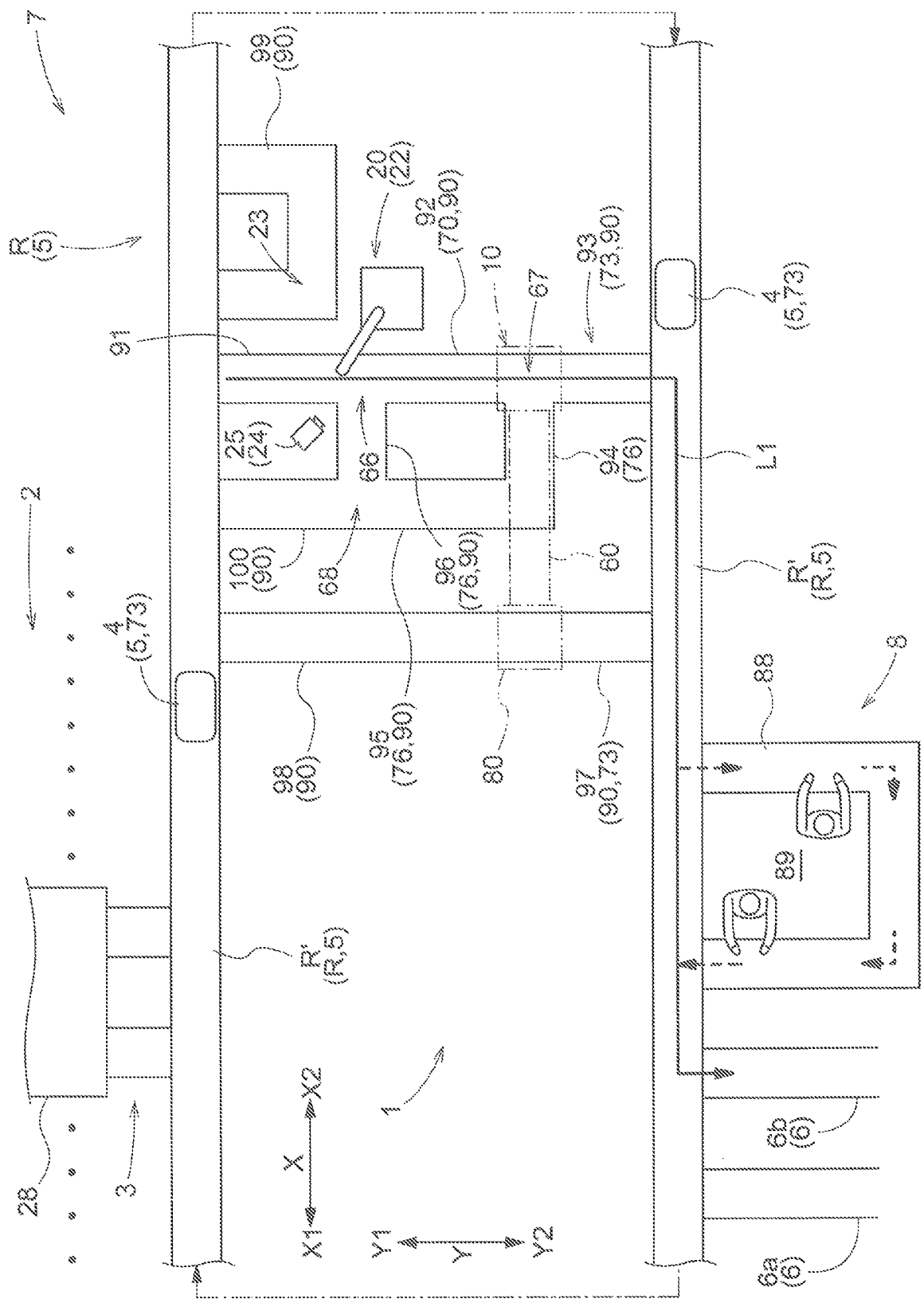
FIG. 12 is a plan view schematically illustrating a route in which the stacked article group is moved.
Figure 14:
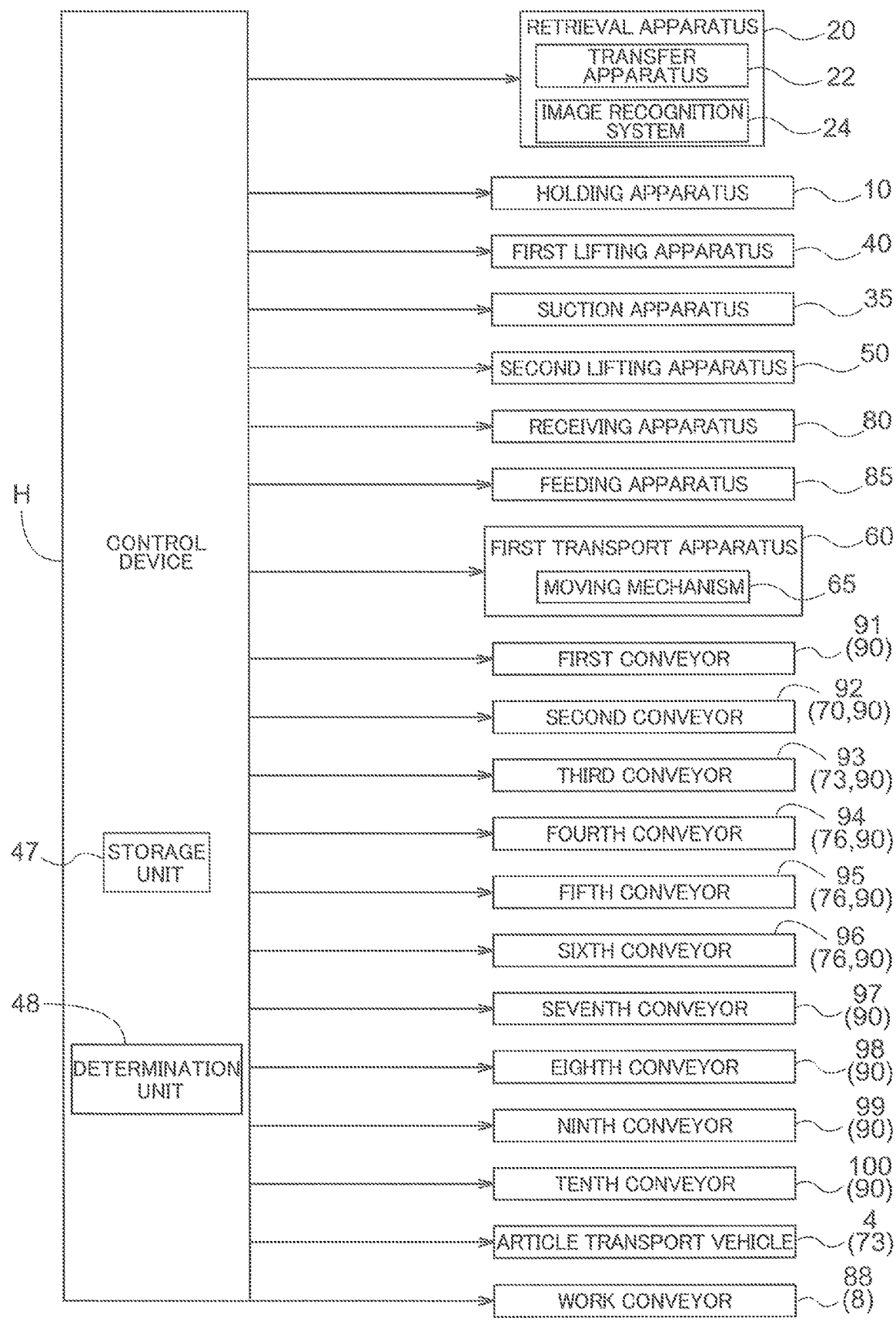
FIG. 14 is a control block diagram.

As indicated by arrows in FIG. 12, the unloading apparatus 1 can move the stacked article group WA to the first conveyor 91, the second conveyor 92, and the third conveyor 93 in this order, and transport the stacked article group WA along a first unloading route L1 for transfer to the article transport vehicle 4. As described above, if articles W are retrieved from the stacked article group WA by the retrieval apparatus 20, and then the sum of the articles W constituting the stacked article group WA remaining on the placement part 9 is equal to the required number, the control device H performs control such that the stacked article group WA is transported along the first unloading route L1. In this case, the stacked article group WA from which the articles W have been retrieved by the retrieval apparatus 20 is passed from the second conveyor 92 to the third conveyor 93 through the first lift 41. That is to say, the control device H does not perform any unloading operation of separating the article subgroup WB from the stacked article group WA using the holding apparatus 10, the suction apparatus 35, and the first lifting apparatus 40. Also, the stacked article group WA transferred to the article transport vehicle 4 from the third conveyor 93 is transported to the addition work area 8 if addition work is to be performed thereon, and the stacked article group WA subjected to the addition work in the addition work area 8 is transported to the delivery conveyor 6*b*. Also, if no addition work is to be performed, the stacked article group WA is transported to the delivery conveyor 6*b* without passing through the addition work area 8.

Figure 13:
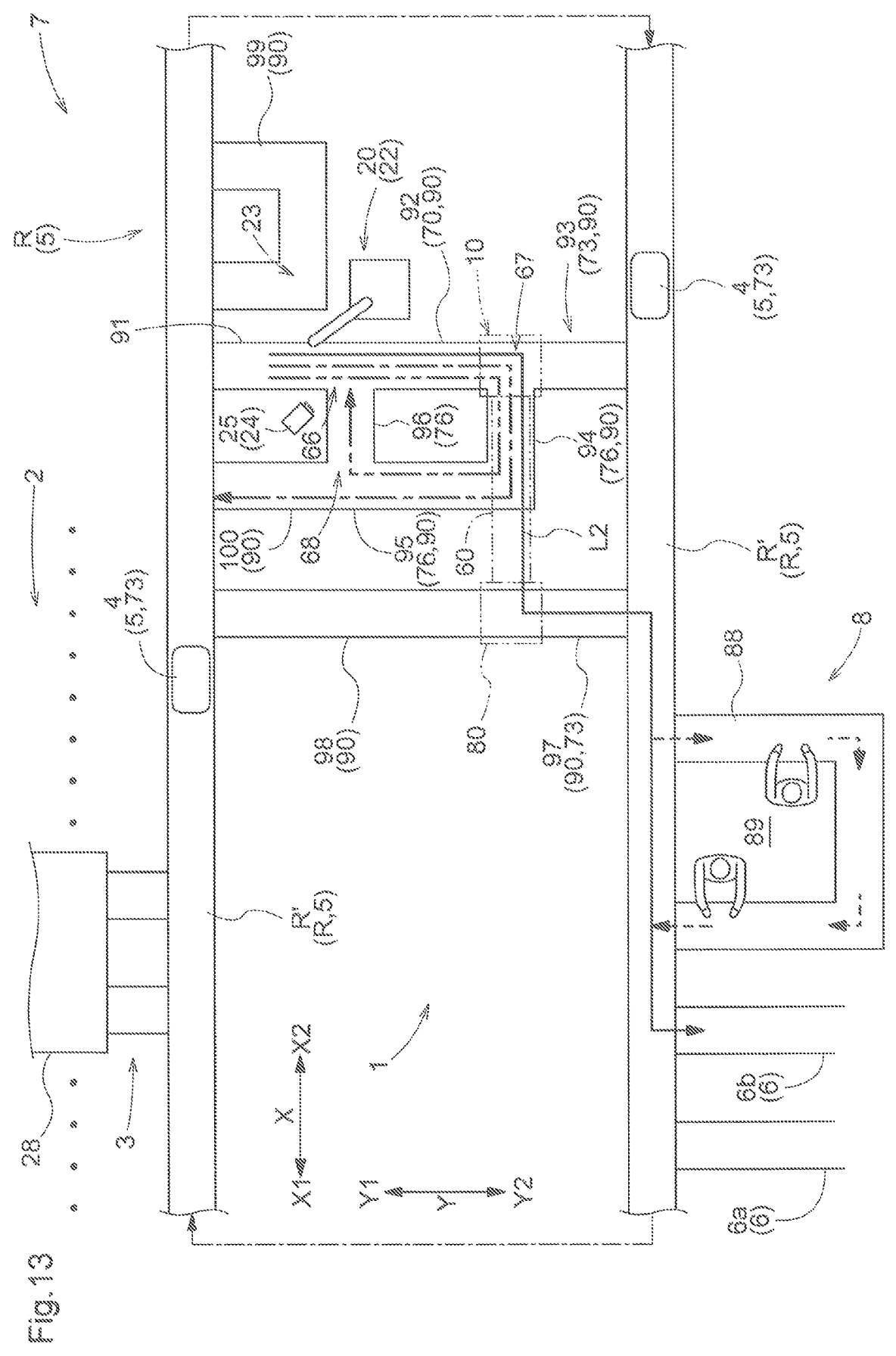

Also, as shown in FIG. 13, in this unloading apparatus 1, the stacked article group WA can be moved to the first conveyor 91 and the second conveyor 92 in this order, the article subgroup WB can be separated from the stacked article group WA by the holding apparatus 10, the separated article subgroup WB can be moved to the receiving apparatus 80 by the first transport apparatus 60, and can then be transported via the seventh conveyor 97 along a second unloading route L2 for transfer to the article transport vehicle 4. If, at a point when the stacked article group WA reaches the junction 66 at which the retrieval apparatus 20 is arranged, the number of articles W constituting the article subgroup WB in the uppermost level in the stacked article group WA, or the number of articles W constituting the article subgroup WB in the uppermost level or the second level from the top of the stacked article group WA is equal to the required number, the control device H selects the second unloading route L2. In this case, the control device H controls the retrieval apparatus 20 not to retrieve the articles W. Also, even if, at a point when the stacked article group WA reaches the junction 66 at which the retrieval apparatus 20 is arranged, the number of articles W of the article subgroup WB in the uppermost level in the stacked article group WA, or the number of articles W constituting the article subgroup WB in the uppermost level or the second level from the top of the stacked article group WA differs from the required number, the retrieval apparatus 20 retrieving the articles W can also make the number of articles W constituting the article subgroup WB in the uppermost level in the stacked article group WA, or the number of articles W constituting the article subgroup WB in the uppermost level or the second level from the top of the stacked article group WA, equal to the required number. Also, in this case, the control device H selects the second unloading route L2. In any case, in the holding apparatus 10, an unloading operation is performed to separate the holding target article group WC set to belong to the uppermost level or the level immediately below the uppermost level (second level from the top), from the article subgroup WB below this holding target article group WC.

Note that the control device H selects the second unloading route L2 also when the above-described required number of articles-separating operation is performed. In this case, the control device H may perform or may not perform retrieval of articles W using the retrieval apparatus 20. In any case, the article subgroup WB transported along the second unloading route L2 and transferred to the article transport vehicle 4 from the seventh conveyor 97 is transported to the addition work area 8 if addition work is to be performed thereon, and the article subgroup WB subjected to the addition work in the addition work area 8 is transported to the delivery conveyor 6*b*. Also, if no addition work is to be performed, the article subgroup WB is transported to the delivery conveyor 6*b* without passing through the addition work area 8.

Also, in the present embodiment, when the second unloading route L2 is selected, either the retrieval apparatus 20 or the suction apparatus 35, or both the retrieval apparatus 20 and the suction apparatus 35 can be used to adjust the number of articles W. Here, when either the retrieval apparatus 20 or the suction apparatus 35 is used to adjust the number of articles W, it is preferable to determine which of the retrieval apparatus 20 and the suction apparatus 35 is to be used, based on, for example, predicted unloading time, which is a predicted time value from the start of an unloading operation (when the stacked article group WA is transferred from the article transport vehicle 4 to the first conveyor 91) to the completion of the unloading operation (when the article subgroup WB is transferred to the delivery conveyor 6*b*). That is to say, predicted unloading time from start to end of an unloading operation when the suction apparatus 35 is used to adjust the number of articles W is denoted as first predicted time T1, and predicted unloading time from start to end of an unloading operation when the retrieval apparatus 20 is used to adjust the number of articles W is denoted as second predicted time T2. Also, when the value of T1 is smaller than the value of T2, the control device H selects adjusting the number of articles W using the suction apparatus 35. Also, when the value of T2 is smaller than the value of T1, the control device H selects adjusting articles W using the retrieval apparatus 20. Note that the criteria for determining which of the retrieval apparatus 20 and the suction apparatus 35 is to be used are not limited to this, and various conditions such as the type or the number of articles W constituting the stacked article group WA, or the shape of the stacked article group WA can be used as the determination criteria.

6. Unloading Operation

Figure 15:
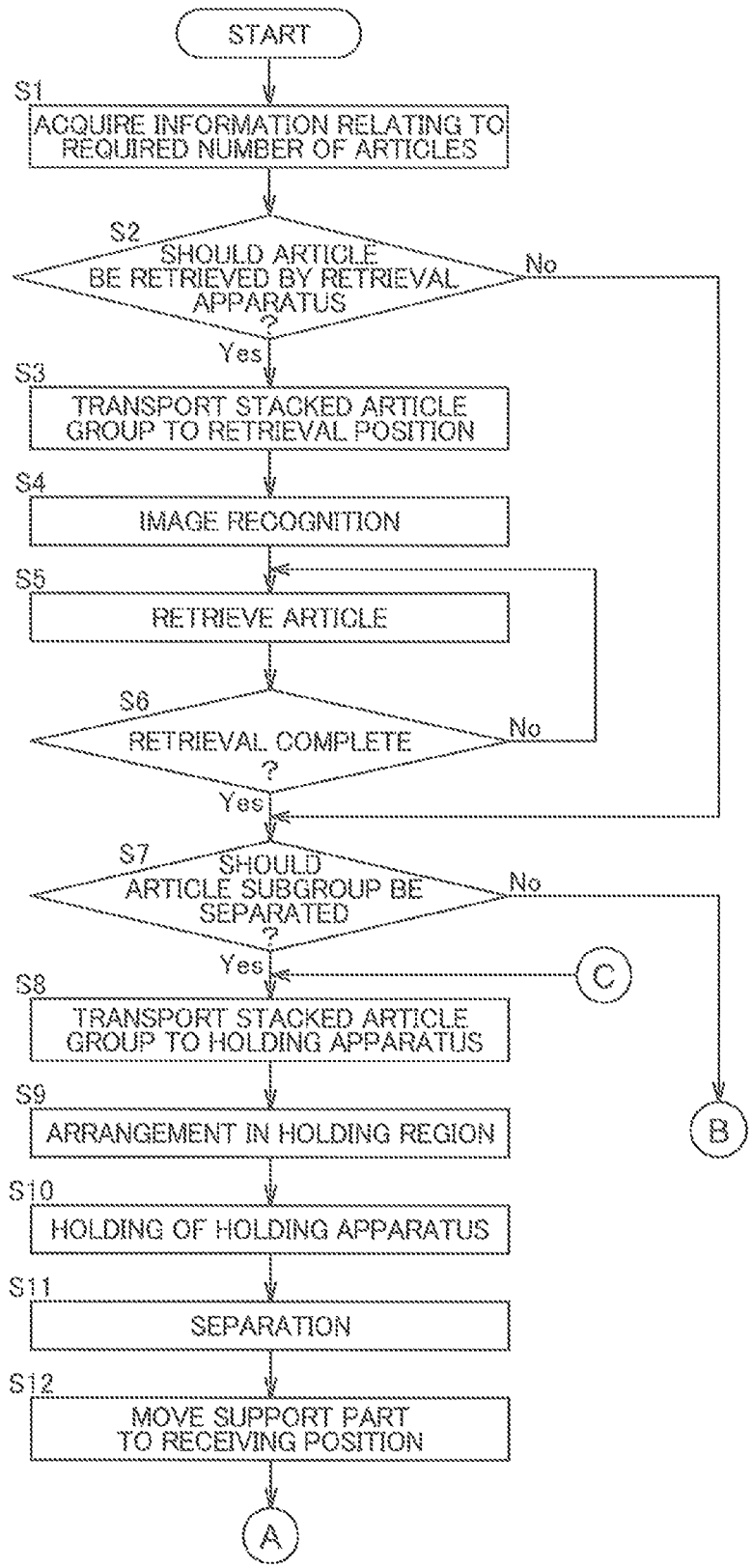
FIG. 15 is a flowchart illustrating control performed by a control device.
Figure 16:
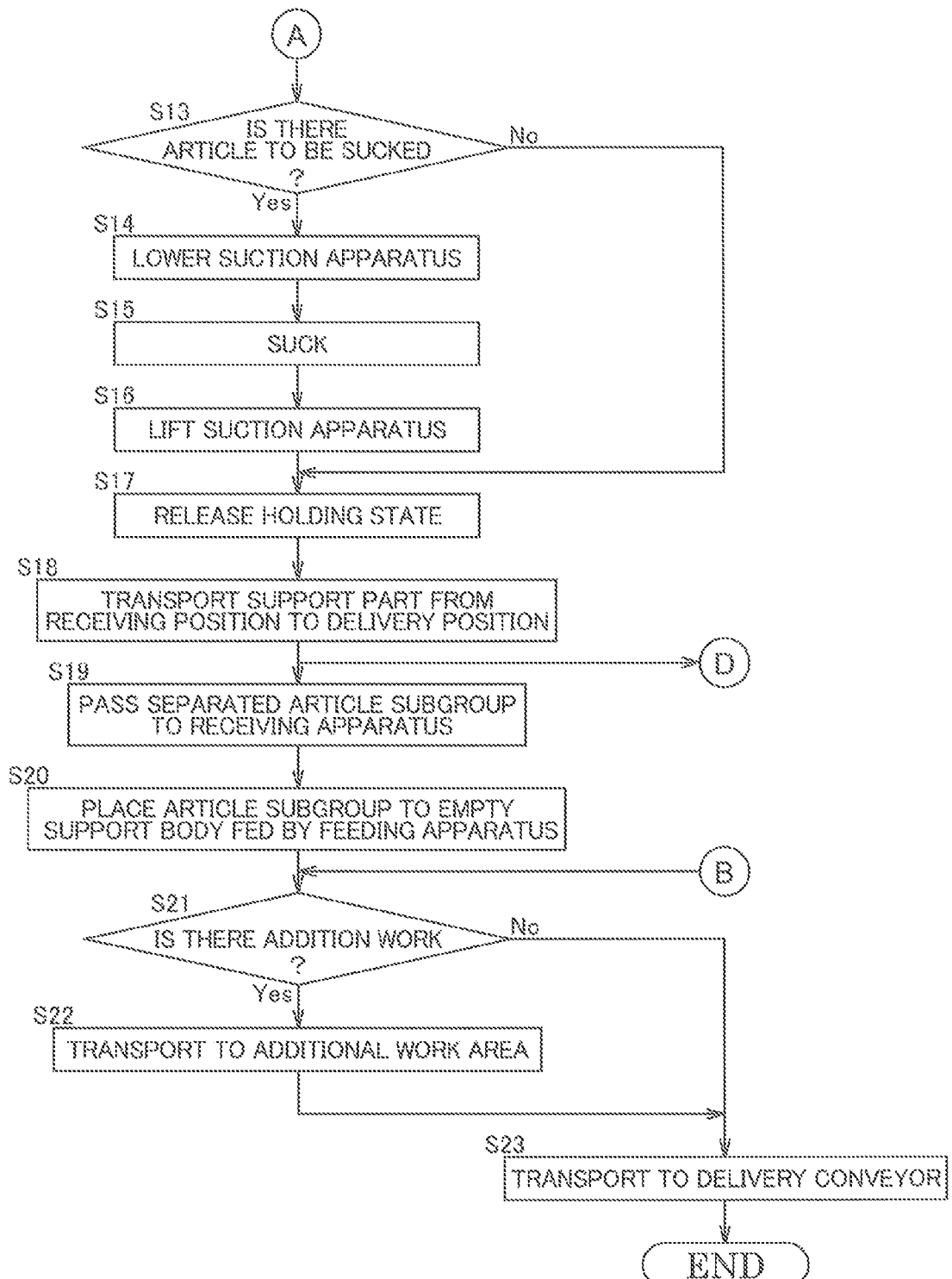
FIG. 16 is a flowchart illustrating control performed by the control device.
Figure 17:
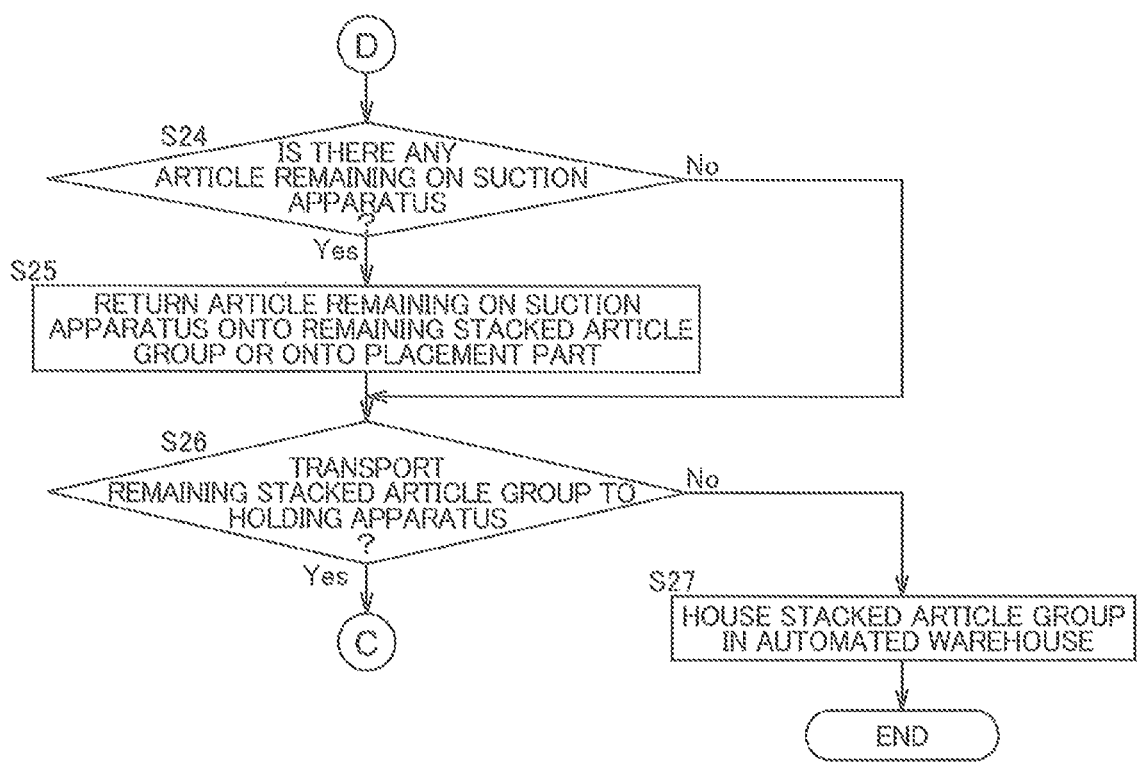
FIG. 17 is a flowchart illustrating control performed by the control device.

The following will describe the unloading operation according to the present embodiment with reference to the flowcharts of FIGS. 15 to 17.

The control device H first acquires, based on instruction information stored in the storage unit 47, information relating to a required number, which is the number of articles W required to be separated from a stacked article group WA and shipped (step S1). Then, the control device H determines whether or not any article W of the stacked article group WA should be retrieved by the retrieval apparatus 20 (step S2). If it is determined that any article W should be retrieved by the retrieval apparatus 20 (YES in step S2), the control device H controls the first conveyor 91 to transport the stacked article group WA transported to the first conveyor 91 from the automated warehouse 2 to a retrieval position (junction 66) (step S3). Then, the control device H controls the image recognition system 24 to perform image recognition on an article subgroup WB in the uppermost level in the stacked article group WA (step S4). When, by the image recognition, the number of articles in the article subgroup WB in the uppermost level is recognized, the control device H controls the transfer apparatus 22 to retrieve the corresponding number of articles W from the article subgroup WB in the uppermost level (step S5). Then, the control device H determines whether or not the retrieval of the corresponding number of articles W by the retrieval apparatus 20 is complete (step S6). If it is determined that the retrieval of the corresponding number of articles W is complete (YES in step S6), the control device H determines whether or not the article subgroup WB needs to be separated from the stacked article group WA by the holding apparatus 10 (step S7). If it is determined that the article subgroup WB needs to be separated from the stacked article group WA (YES in step S7), the control device H controls the second conveyor 92 (second transport apparatus 70) and the first lifting apparatus 40 to transport the stacked article group WA to the holding apparatus 10 (step S8). Note that the control device H controls the transfer apparatus 22 to continue retrieving the articles W until the retrieval of the corresponding number of articles W by the retrieval apparatus 20 is complete (NO in step S6).

Then, the control device H controls the first lifting apparatus 40 to arrange a holding target article group WC in the holding region 17 (step S9). Then, the control device H controls the holding apparatus 10 to hold the holding target article group WC using the holding members 11 (step S10). Then, the control device H controls the first lifting apparatus 40 to separate the article subgroup WB including the holding target article group WC from the stacked article group WA (step S11). Then, the control device H controls the first transport apparatus 60 to move the support part 63 to the receiving position (step S12). Also, the control device H determines whether or not the suction apparatus 35 needs to suck and hold one or more articles W (step S13). If it is determined that the suction apparatus 35 needs to suck and hold one or more articles W (YES in step S13), the control device H controls the second lifting apparatus 50 to lower the suction apparatus 35 (step S14). Then, the control device H controls the suction apparatus 35 to suck and hold some or all of the articles W of the suction target article group WD in the uppermost level in the stacked article group WA (step S15). Then, the control device H controls the second lifting apparatus 50 to lift the suction apparatus 35 (step S16). Note that in this example, the processing in steps S S13 to S16 is executed after step S12, but the processing in steps S13 to S16 may also be executed during a period overlapping with the processing in steps S9 to S12. Then, the control device H controls the holding apparatus 10 to release the holding state of holding the holding target article group WC (step S17). With this, the article subgroup WB is passed from the holding apparatus 10 to the support part 63. Note that if it is determined that the suction apparatus 35 does not need to suck and hold the articles W (NO in step S13), the control device H executes the processing in step S17 without causing the suction apparatus 35 to suck and hold the articles W. Then, the control device H controls the first transport apparatus 60 to transport the support part 63 from the receiving position to the delivery position (step S18). Then, the control device H controls the receiving apparatus 80 to pass the separated article subgroup WB to the receiving apparatus 80 (step S19).

Then, the control device H controls the receiving apparatus 80 and the feeding apparatus 85 to place the article subgroup WB held by the receiving apparatus 80 to an empty support body 84 fed by the feeding apparatus 85 (step S20). Then, the control device H determines whether or not an addition work needs to be performed on the article subgroup WB placed on the support body 84 (step S21). With this determination, if it is determined that addition work needs to be performed (YES in step S21), the control device H controls the seventh conveyor 97 and the article transport vehicle 4 (third transport apparatus 73) to transport the article subgroup WB to the addition work area 8 (step S22).

On the other hand, if it is determined by the control device H in the determination in step S7 that the article subgroup WB does not need to be separated from the stacked article group WA (NO in step S7), the procedure moves to the processing in step S21 without the stacked article group WA being transported to the holding apparatus 10. Then, the control device H controls the article transport vehicle 4 to transport the article subgroup WB to the delivery conveyor 6*b* (step S23). Note that if it is determined in the determination in step S21 that no addition work needs to be performed on the article subgroup WB (NO in step S21), the control device H controls the article transport vehicle 4 to transport the article subgroup WB to the delivery conveyor 6*b* without passing through the addition work area 8 (step S23).

Also, after the support part 63 on which the article subgroup WB has been placed is transported from the receiving position to the delivery position, the control device H determines whether or not there is any remaining article W sucked and held by the suction apparatus 35 (step S24). If it is determined that there is any article W on the suction apparatus 35 (YES in step S24), the control device H controls the suction apparatus 35, the second lifting apparatus 50, and the first lifting apparatus 40 to return the article W remaining on the suction apparatus 35 onto the stacked article group WA remaining on the placement part 9 or onto the placement part 9 (step S25). Then, the control device H determines whether or not the remaining stacked article group WA should be transported to the holding apparatus 10 (step S26). If it is determined that there is no article W remaining on the suction apparatus 35 (NO in step S24), the control device H determines whether or not the remaining stacked article group WA should be transported again to the holding apparatus 10 again (step S26). If it is determined that the stacked article group WA should be transported to the holding apparatus 10 (YES in step S26), the control device H controls the fourth conveyor 94, the fifth conveyor 95, and the sixth conveyor 96 (fourth transport apparatus 76) to transport this stacked article group WA to the holding apparatus 10. On the other hand, if it is determined that the remaining stacked article group WA does not need to be transported to the holding apparatus 10 (NO in step S26), the control device H controls the third conveyor 93 and the article transport vehicle 4 to house this stacked article group WA in the automated warehouse (step S27).

7. Other Embodiments

The following will describe other embodiments of the unloading apparatus.

(1) The above-described embodiment has described, as an example, a configuration in which, of the stacked article group WA, the article subgroup WB in the uppermost level or the article subgroup WB in a level immediately below the uppermost level (the second level from the top) is held as the holding target article group WC, and the holding target article group WC and the article subgroup WB above the holding target article group WC are held by the holding apparatus 10. However, the present invention is not limited to this configuration, and the holding apparatus 10 may hold an article subgroup WB in any level of the stacked article group WA as the holding target article group WC. Even if an article subgroup WB in any level is regarded as the holding target article group WC, this holding target article group WC and the article subgroup WB above the holding target article group WC are held by the holding apparatus 10. It is preferable that the settings of the level of the article subgroup WB to be held as the holding target article group WC are changed based on the type, shape, material, or the like of the articles W.

(2) The above-described embodiment has described, as an example, a configuration in which, when articles W held by the suction apparatus 35 are to be returned onto the stacked article group WA remaining on the placement part 9, the control device H controls the suction apparatus 35 to preferentially return, out of the articles W held by the suction apparatus 35, an article W to be located near a side peripheral surface of the stacked article group WA. However, the present invention is not limited to this configuration, and it is also possible to preferentially return, out of the articles W held by the suction apparatus 35, an article W to be located near the central portion of the stacked article group WA, for example. Alternatively, it is also possible not to decide the preferential order of returning the articles W held by the suction apparatus 35.

(3) The above-described embodiment has described, as an example, a configuration in which the unloading apparatus 1 can use either or both of the retrieval apparatus 20 and the suction apparatus 35 to adjust the number of articles W. The present invention is not limited to this configuration, and a configuration is also possible in which, for example, the unloading apparatus 1 does not include any retrieval apparatus 20 but only includes the suction apparatus 35.

(4) The above-described embodiment has described, as an example, a configuration in which the position of the holding apparatus 10 in the up-down direction Z is fixed, and the suction apparatus 35 and the holding apparatus 10 are lifted relative to each other as a result of the second lifting apparatus 50 moving the suction apparatus 35 in the up-down direction Z. However, the present invention is not limited to this configuration, and a configuration is also possible in which, for example, the position of the suction apparatus 35 in the up-down direction Z is fixed, and the suction apparatus 35 and the holding apparatus 10 are lifted relative to each other as a result of the holding apparatus 10 moving in the up-down direction Z. Alternatively, a configuration is also possible in which both the holding apparatus 10 and the suction apparatus 35 move in the up-down direction Z.

(5) The above-described embodiment has described, as an example, a configuration in which, in the holding apparatus 10, an article subgroup WB separated from the stacked article group WA is passed from the first transport apparatus 60 to the third transport apparatus 73 via the receiving apparatus 80. However, the present invention is not limited to this configuration, and a configuration is also possible in which, for example, the first transport apparatus 60 and the third transport apparatus 73 are directly connected to each other, and an article subgroup WB is transported from the first transport apparatus 60 to the third transport apparatus 73 without passing through the receiving apparatus 80.

(6) The configurations disclosed in the above-described embodiments (including the above-described embodiment and other embodiments; the same applies to the following) can be combined with and applied to configurations disclosed in other embodiments unless there is any contradiction. Regarding other configurations, the embodiments disclosed in the present specification are illustrative in all respects, and can be changed as appropriate without departing from the spirit of the present disclosure.

8. Overview of Above-Described Embodiments

Hereinafter, overview of the unloading apparatus explained above will be described.

An unloading apparatus configured to separate, from a stacked article group composed of a plurality of articles stacked on a placement part, at least one article subgroup composed of a plurality of articles belonging to at least one level, the unloading apparatus including: a holding apparatus configured to hold side peripheral surfaces of a holding target article group, which is an article subgroup in one level among a plurality of article subgroups in a plurality of levels which article subgroups are included in the stacked article group, in such a manner as to hold the holding target article group and an article subgroup above the holding target article group; a suction apparatus including a plurality of suction parts that are configured to hold a plurality of articles constituting a suction target article group by sucking upper surfaces of the plurality of articles, and are configured to operate independently from each other, the suction target article group being an article subgroup in an uppermost level among the plurality of article subgroups in the plurality of levels which article subgroups are included in the stacked article group; a first lifting apparatus configured to lift and lower the placement part and the holding apparatus relative to each other; a second lifting apparatus configured to lift and lower the suction apparatus and the holding apparatus relative to each other; and a first transport apparatus configured to receive at least one article subgroup held by the holding apparatus from the holding apparatus, and transport the at least one received article subgroup.

According to this configuration, the holding apparatus can be used to separate, from the stacked article group, an article subgroup per layer.

Also, the suction apparatus can be used to separate, from the stacked article group, one or more articles of the article subgroup in the uppermost level. Accordingly, for example, by using the holding apparatus to hold the side peripheral surfaces of an article subgroup in a level below the uppermost level in the stacked article group, and using the first lifting apparatus to lift and lower the placement part and the holding apparatus relative to each other, it is possible to separate at least one article subgroup from the stacked article group. Furthermore, by using the suction apparatus to hold one or more articles from the article subgroup in the uppermost level, and using the second lifting apparatus to lift and lower the suction apparatus and the holding apparatus relative to each other, it is possible to leave a required number of articles on the holding apparatus side. Also, by using the first transport apparatus to receive the article subgroup held by the holding apparatus, it is possible to separate and transport a required number of articles from the stacked article group. With this, according to this configuration, it is possible to unload, from the stacked article group, articles the number of which is other than an integral multiple of the number of articles constituting an article subgroup in one level.

Here, preferably, the unloading apparatus further includes: a control device configured to control the holding apparatus, the suction apparatus, the first lifting apparatus, the second lifting apparatus, and the first transport apparatus, wherein the control device performs an operation for separating a required number of articles in which the holding apparatus holds the side peripheral surfaces of the holding target article group set to belong to a level below the uppermost level of the stacked article group, the first lifting apparatus separates article subgroups in a plurality of levels from the stacked article group, the suction apparatus sucks and holds at least one article in the suction target article group that is an article subgroup in an uppermost level among the separated article subgroups in the plurality of levels, the second lifting apparatus lifts the at least one article held by the suction apparatus relative to the holding apparatus, the first transport apparatus receives and transports the at least one article subgroup held by the holding apparatus, and the suction apparatus returns the at least one article held by the suction apparatus onto a stacked article group remaining on the placement part or onto the placement part.

According to this configuration, since one or more articles from the article subgroup in the uppermost level can be sucked and held, the holding apparatus can hold a required number of articles that is other than an integral multiple of the number of articles constituting an article subgroup in one layer, out of the stacked article group. Also, by the control device controlling the first lifting apparatus and the first transport apparatus, it is possible to separate the required number of articles from the stacked article group and transport them. Then, by returning the articles held by the suction apparatus onto the stacked article group remaining on the placement part, or onto the placement part, all of the articles remaining after separating the required number of articles can be returned onto the placement part.

Also, preferably, in a case where the suction apparatus sucks and holds the at least one article in the suction target article group, and then the suction apparatus is to return the at least one article held by the suction apparatus onto the stacked article group remaining on the placement part or onto the placement part, the control device controls the suction apparatus to preferentially return, out of the at least one article held by the suction apparatus, an article that is to be located near a side peripheral surface of the stacked article group.

Since the holding apparatus holds the side peripheral surfaces of the holding target article group, when article subgroups in a plurality of levels are held by the holding apparatus, the holding target article group may fall apart due to a load applied to the central side far from the side peripheral surfaces. According to this configuration, since the articles are preferentially returned to a side close to a side peripheral surface in the uppermost level of the stacked article group on the placement part, the article subgroup including the holding target article group can be unlikely to fall apart when it is to be held by the holding apparatus next time.

Also, preferably, the unloading apparatus further includes: a retrieval apparatus configured to retrieve one or more articles from the article subgroup in the uppermost level in the stacked article group; and a second transport apparatus configured to transport the stacked article group from the retrieval apparatus to the holding apparatus and the suction apparatus.

According to this configuration, before the stacked article group is transported to the holding apparatus and the suction apparatus, the retrieval apparatus can retrieve one or more articles from the article subgroup in the uppermost level. With this, it is possible to separate and transport, from the stacked article group, articles the number of which is less than the number of articles constituting an article subgroup in one layer, without using the holding apparatus and the suction apparatus.

Also, preferably, the first lifting apparatus lifts and lowers the placement part relative to the holding apparatus, the second lifting apparatus lifts and lowers the suction apparatus relative to the holding apparatus, the first transport apparatus includes a support part configured to support the at least one article subgroup received from the holding apparatus, and a moving mechanism configured to move the support part, and the moving mechanism moves the support part, below the holding apparatus, between a receiving position that is overlapped with the holding apparatus when viewed in an up-down direction, and a delivery position that is not overlapped with the holding apparatus when viewed in the up-down direction.

According to this configuration, it is possible to appropriately perform unloading of articles the number of which is other than an integral multiple of the number of articles constituting an article subgroup in one layer, from the stacked article group. Also, at this time, by passing a required number of articles held by the holding apparatus to the moving mechanism at a receiving position located below the holding apparatus, and moving the required number of articles to the delivery position, the at least one article subgroup separated from the stacked article group can be transported as appropriate.

Also, preferably, the unloading apparatus further includes: a receiving apparatus configured to receive the at least one article subgroup from the first transport apparatus and place the at least one received article subgroup on the support body; a feeding apparatus configured to feed an empty support body to the receiving apparatus; and a third transport apparatus configured to transport the support body on which the at least one article subgroup has been placed by the receiving apparatus to an addition work area, wherein in the addition work area, work of adding one or more articles to the at least one article subgroup placed on the support body is performed.

According to this configuration, the at least one article subgroup separated from the stacked article group can be transported to the additional work area, while being placed on the support body. Then, in the additional work area, an operator, a robot, or the like can perform work of adding one or more articles to the article subgroups. With this, even if work is required such as, for example, adding, to the support body, articles having a shape and a size difficult to be handled by the unloading apparatus, it is possible to appropriately perform this work.

INDUSTRIAL APPLICABILITY

The technique according to the present disclosure is applicable to an unloading apparatus.

What is claimed is:

1. An unloading apparatus configured to separate, from a stacked article group composed of a plurality of articles stacked on a placement part, at least one article subgroup composed of a plurality of articles belonging to at least one level, the unloading apparatus comprising:
a holding apparatus configured to hold side peripheral surfaces of a holding target article group, which is an article subgroup in one level other than an uppermost level among a plurality of article subgroups in a plurality of levels which article subgroups are included in the stacked article group, in such a manner as to hold the holding target article group and an article subgroup above the holding target article group;
a suction apparatus including a plurality of suction parts that are configured to hold a plurality of articles constituting a suction target article group by sucking upper surfaces of the plurality of articles, and are configured to operate independently from each other, the suction target article group is an article subgroup in the uppermost level among the plurality of article subgroups in the plurality of levels which article subgroups are included in the stacked article group;
a first lifting apparatus configured to lift and lower the placement part and the holding apparatus relative to each other;
a second lifting apparatus configured to lift and lower the suction apparatus and the holding apparatus relative to each other; and
a first transport apparatus configured to receive at least one article subgroup held by the holding apparatus from the holding apparatus, and transport the at least one received article subgroup,
wherein the holding apparatus and the first lifting apparatus cooperate so that the article subgroup held by the holding apparatus is separated from the article subgroup located below the holding target article group, and the suction apparatus and the second lifting apparatus cooperate so that some or all of the articles of the suction target article group are separated from the article subgroup held by the holding apparatus.

2. The unloading apparatus according to claim 1, further comprising:
a control device configured to control the holding apparatus, the suction apparatus, the first lifting apparatus, the second lifting apparatus, and the first transport apparatus, and
wherein the control device performs an operation for separating a required number of articles in which the holding apparatus holds the side peripheral surfaces of the holding target article group belonging to a level below the uppermost level of the stacked article group, the first lifting apparatus separates article subgroups in a plurality of levels from the stacked article group, the suction apparatus sucks and holds at least one article in the suction target article group that is an article subgroup in an uppermost level among the separated article subgroups in the plurality of levels, the second lifting apparatus lifts the at least one article held by the suction apparatus relative to the holding apparatus, the first transport apparatus receives and transports the at least one article subgroup held by the holding apparatus, and the suction apparatus returns the at least one article held by the suction apparatus onto a stacked article group remaining on the placement part or onto the placement part.

3. The unloading apparatus according to claim 2, wherein in a case where the suction apparatus sucks and holds the at least one article in the suction target article group, and then the suction apparatus is to return the at least one article held by the suction apparatus onto the stacked article group remaining on the placement part or onto the placement part, the control device controls the suction apparatus to return, out of the at least one article held by the suction apparatus, an article that is to be located near a side peripheral surface of the stacked article group, prior to the article that is to be located far from the side peripheral surface.

4. The unloading apparatus according to claim 1, further comprising:
a retrieval apparatus configured to retrieve one or more articles from the article subgroup in the uppermost level in the stacked article group; and
a second transport apparatus configured to transport the stacked article group from the retrieval apparatus to the holding apparatus and the suction apparatus.

5. The unloading apparatus according to claim 1, wherein:
the first lifting apparatus lifts and lowers the placement part relative to the holding apparatus,
the second lifting apparatus lifts and lowers the suction apparatus relative to the holding apparatus,
the first transport apparatus comprises:
a support part configured to support the at least one article subgroup received from the holding apparatus; and
a moving mechanism configured to move the support part, and
the moving mechanism moves the support part, below the holding apparatus, between a receiving position that is overlapped with the holding apparatus when viewed in an up-down direction, and a delivery position that is not overlapped with the holding apparatus when viewed in the up-down direction.

6. The unloading apparatus according to claim 1, further comprising:
a receiving apparatus configured to receive the at least one article subgroup from the first transport apparatus and place the at least one received article subgroup on a support body;

a feeding apparatus configured to feed an empty support body to the receiving apparatus; and
a third transport apparatus configured to transport the support body on which the at least one article subgroup has been placed by the receiving apparatus to an addition work area, and
wherein in the addition work area, work of adding one or more articles to the at least one article subgroup placed on the support body is performed.

7. The unloading apparatus according to claim 1, further comprising:
a control device configured to control the holding apparatus, the suction apparatus, the first lifting apparatus, the second lifting apparatus, and the first transport apparatus,
wherein the control device is configured to determine a number of the articles required to be sucked by the suction apparatus to that a sum of a number of the articles of the holding target article group and a number of the articles that are located on the holding target article group and are not sucked by the suction apparatus is equal to a required number which is a number of the articles required to be separated from the stacked article group.

8. The unloading apparatus according to claim 1, wherein:
with a first direction being a direction in which the first transport apparatus transports the article subgroup, and a second direction being a direction orthogonal to the first direction when viewed in an up-down direction,
the holding apparatus comprises a first holding member and a third holding member facing each other in the first direction with the holding target article group interposed therebetween; and a second holding member and a fourth holding member facing each other in the second direction with the holding target article group interposed therebetween,
the first holding member and the third holding member are each movable in the first direction, and are configured to push and hold the holding target article group in the first direction by the first holding member and the third holding member coming close to each other in the first direction, and
the second holding member and the fourth holding member are each movable in the second direction, and are configured to push and hold the holding target article group in the second direction by the second holding member and the fourth holding member coming close to each other in the second direction.

9. An unloading apparatus configured to separate, from a stacked article group composed of a plurality of articles stacked on a placement part, at least one article subgroup composed of a plurality of articles belonging to at least one level,
the unloading apparatus comprising:
a holding apparatus configured to hold side peripheral surfaces of a holding target article group, which is an article subgroup in one level among a plurality of article subgroups in a plurality of levels which article subgroups are included in the stacked article group, in such a manner as to hold the holding target article group and an article subgroup above the holding target article group;
a suction apparatus including a plurality of suction parts that are configured to hold a plurality of articles constituting a suction target article group by sucking upper surfaces of the plurality of articles, and are configured to operate independently from each other, the suction target article group is an article subgroup in an uppermost level among the plurality of article subgroups in the plurality of levels which article subgroups are included in the stacked article group;
a first lifting apparatus configured to lift and lower the placement part and the holding apparatus relative to each other;
a second lifting apparatus configured to lift and lower the suction apparatus and the holding apparatus relative to each other; and
a first transport apparatus configured to receive at least one article subgroup held by the holding apparatus from the holding apparatus, and transport the at least one received article subgroup,
wherein the unloading apparatus further comprises: a control device configured to control the holding apparatus, the suction apparatus, the first lifting apparatus, the second lifting apparatus, and the first transport apparatus, and
wherein the control device performs an operation for separating a required number of articles in which the holding apparatus holds the side peripheral surfaces of the holding target article group belonging to a level below the uppermost level of the stacked article group, the first lifting apparatus separates article subgroups in a plurality of levels from the stacked article group, the suction apparatus sucks and holds at least one article in the suction target article group that is an article subgroup in an uppermost level among the separated article subgroups in the plurality of levels, the second lifting apparatus lifts the at least one article held by the suction apparatus relative to the holding apparatus, the first transport apparatus receives and transports the at least one article subgroup held by the holding apparatus, and the suction apparatus returns the at least one article held by the suction apparatus onto a stacked article group remaining on the placement part or onto the placement part,
wherein in a case where the suction apparatus sucks and holds the at least one article in the suction target article group, and then the suction apparatus is to return the at least one article held by the suction apparatus onto the stacked article group remaining on the placement part or onto the placement part, the control device controls the suction apparatus to return, out of the at least one article held by the suction apparatus, an article that is to be located near a side peripheral surface of the stacked article group, prior to the article that is to be located far from the side peripheral surface.

* * * * *